(12) United States Patent
Kouvelas

(10) Patent No.: US 8,036,139 B2
(45) Date of Patent: Oct. 11, 2011

(54) INTERNAL BGP DOWNLOADER

(75) Inventor: Isidor Kouvelas, Burlingame, CA (US)

(73) Assignee: Cisco Technology, Inc., San Jose, CA (US)

( * ) Notice: Subject to any disclaimer, the term of this patent is extended or adjusted under 35 U.S.C. 154(b) by 1129 days.

(21) Appl. No.: 10/428,442

(22) Filed: May 1, 2003

(65) Prior Publication Data

US 2004/0081154 A1 Apr. 29, 2004

Related U.S. Application Data

(60) Provisional application No. 60/421,724, filed on Oct. 28, 2002, provisional application No. 60/421,723, filed on Oct. 28, 2002.

(51) Int. Cl.
*H04L 12/28* (2006.01)
(52) U.S. Cl. ....................................... 370/254
(58) Field of Classification Search .............. 370/56, 370/401, 254–256, 392, 238; 709/201–203, 709/205, 238, 242, 250
See application file for complete search history.

(56) References Cited

U.S. PATENT DOCUMENTS

| 6,130,890 A | 10/2000 | Leinwand et al. |
| 2002/0021675 A1* | 2/2002 | Feldmann .................... 370/254 |
| 2002/0024934 A1 | 2/2002 | Galand et al. |
| 2003/0021232 A1* | 1/2003 | Duplaix et al. ............... 370/238 |
| 2004/0006640 A1* | 1/2004 | Inderieden et al. ........... 709/242 |

OTHER PUBLICATIONS

Rekhter, Y., et al. "A Border Gateway Protocol 4 BGP-4," RFC 1771, Internet Engineering Task Force, Mar. 1995, 57 pages.
Stewart, John W., III, *BGP4 Inter-Domain Routing in the Internet*, Addison-Wesley, 1999, Chapter 4: "BGP Extensions," pp. 88-116.
D. Haskin, "A BGP/IDRP Route Server Alternative to a Full Mesh Routing", RFC 1863, Oct. 1995.

* cited by examiner

*Primary Examiner* — Kevin C Harper
*Assistant Examiner* — Leon Andrews
(74) *Attorney, Agent, or Firm* — Cindy Kaplan

(57) ABSTRACT

Improved systems and methods for distributing interdomain routing information within an Autonomous System (AS). A protocol extension to BGP, iBGPd (internal Border Gateway Protocol downloader), has been developed to replace IBGP in distributing BGP interdomain routing information within an AS. The iBGPd technique distributes routing information hop-by-hop using a reliable multi-party transport protocol. Scalability is greatly improved since the use of a full mesh of TCP connections is avoided. Also, there are improvements in routing information propagation delay and routing stability. Drawbacks related to the use of route reflectors and confederations are avoided.

25 Claims, 27 Drawing Sheets

| A | B | C |
|---|---|---|
| 1 | 2 | 3 |
|   | 4 |   |

FIG. 16A

INTERNAL BGP DOWNLOADER

STATEMENT OF RELATED APPLICATIONS

The present application claims priority from U.S. Provisional App. No. 60/421,724, filed on Oct. 28, 2002, entitled, "RPF MULTI-PARTY RELIABLE TRANSPORT (RMRT)".

The present application claims priority from U.S. Provisional App. No. 60/421,723, filed on Oct. 28, 2002, entitled, "INTERNAL BORDER GATEWAY PROTOCOL DOWNLOADER (IBGPD)."

The present application is related to the co-filed application entitled "RPF MULTI-PARTY RELIABLE TRANSPORT."

The contents of the above-identified applications are herein incorporated by reference for all purposes.

BACKGROUND OF THE INVENTION

The present invention relates to data networking and more particularly to distribution of routing information in the Internet.

Packets travel from their origin to their destination through a series of routers. The route is not generally predetermined but rather selected hop-by-hop based on the destination network address. A forwarding table at each router correlates destination address information to next-hops. Internet routing protocols concern themselves with appropriately populating the contents of such forwarding tables.

For routing purposes, the Internet may be considered to be divided into Autonomous Systems (ASs) where each AS is a group of networks and routers under common administrative control. The routing of packets within an AS is addressed by an intradomain protocol or interior gateway protocol (IGP) operative within that AS. There are several different available IGPs including OSPF, RIP, etc. Routing of packets across AS boundaries is controlled by an interdomain routing protocol. The current prevalent interdomain routing protocol is BGP and is described in, e.g., Rekhter, et al. "A Border Gateway Protocol 4 BGP-4," RFC 1771, Internet Engineering Task Force, March 1995 the contents of which are herein incorporated by reference in their entirety.

A single BGP session involves two nodes and involves an exchange of routing information via a point-to-point TCP connection. For example, one node will tell the other node, e.g., that a particular route is available to a particular network or that a previously advertised route is no longer available. Destination networks are identified by prefixes, i.e., a combination of destination network address and bit mask to be used in matching packet addresses to the network address. A particular unit of route information may be referred to herein as a "path." A path identifies 1) a destination network address (prefix), 2) a list of AS's traversed by the BGP message containing the path on its way to the BGP listener, and 3) a next-hop address, i.e., an address of a border router within the AS of the BGP listener that may be used to reach the destination network address. Nodes receiving BGP route updates will use the information to update their own forwarding tables and to propagate the route updates further. A node receiving multiple paths to the same destination network will generally pick one or more for its forwarding table and to distribute to other nodes via BGP. In this manner, information about how to route packets across AS boundaries is propagated across the Internet.

Different variants of BGP communication are used depending on whether the route information is itself being distributed across AS boundaries or within an AS. External BGP (EBGP) is used to distribute route information across AS boundaries while Internal BGP (IBGP) is used to distribute route information within an AS. Again, for both kinds of BGP, the route information concerns how to route payload packets across AS boundaries.

In practice, border routers at the borders of an AS will use EBGP to communicate paths with other AS's and IBGP to distribute the route information they have learned within their own AS. The message structure and types of information communicated are highly similar. However, EBGP and IBGP have different rules for advertising paths. In particular, a border router that learns about a path via EBGP may advertise this path via either EBGP or IBGP. A path that is learned via IBGP cannot, however, be advertised to another node via IBGP. This is done to avoid routing update loops. BGP's method for avoiding routing loops is to track the AS boundaries that are crossed. This does not work within an AS so information learned via IBGP is not readvertised.

A consequence of this rule is that the basic IBGP protocols rely on a full mesh of BGP sessions between each border router and each router in the AS interior. This approach suffers from serious scalability problems. The number of TCP connections from each router grows linearly with the number of routers in the AS. An additional drawback is that multiple IBGP connections from a BR to internal routers may traverse the same link forcing identical information to be carried as many times over the link.

Because of these problems, alternate approaches have been developed. One such approach is to add hierarchy by employing route reflection. Some nodes in the AS act as route reflectors. A route reflector has assigned client routers and readvertises routes it hears from non-clients to clients and routes it hears from clients to non-clients. Deploying route reflectors solves the "full mesh" scalability problems at the expense of possible routing information inconsistency, additional convergence delay and introduction of artificial failure points.

Route reflectors use IBGP connections to communicate with their clients. The route reflectors only propagate a single path for each destination network from the options available to them. The selection made by the route reflector on behalf of its clients hides information and may result in forwarding as well as routing update loops. Ongoing work is adding the capability of conveying multiple viable paths through IBGP in an attempt to solve these problems.

Route reflectors also affect the speed of propagation of BGP routing information through the AS. A route reflector reuses much of the mechanism of a regular BGP speaker and operates as follows:

1. The route reflector receives viable paths from a number of AS BRs (or other route reflectors if multiple levels of reflector hierarchy are used).
2. It runs a BGP best path algorithm to calculate the winning path for each destination network.
3. It propagates the winning path to its clients.

The three steps in the above process can take a variable amount of time, depending on the BGP implementation. The total delay for a route reflector to propagate a route can be significant. The delay introduced by route reflectors clearly does not exist in the "full mesh" IBGP solution as border routers propagate information in parallel to all other AS routers.

An additional problem of route reflectors is that they introduce an artificial point of failure. A route reflector conveys to its clients paths to remote destinations through AS border routers. When the route reflector fails, a client no longer receives paths. However, the route reflector failure does not mean that the client has lost the ability to forward data towards the border router. In fact even if the route reflector was on the forwarding path between the client and the border router, the IGP operated by the AS may converge on an alternative internal path. Hence, the route reflector failure disables the client although network connectivity still exists. A deployment workaround is to configure the network so that internal routers are always clients of more than one route reflector. As long as one of the route reflectors serving a client is functional, the client will receive BGP information. The drawback is that now the client has to receive process and store redundant information from each of the multiple route reflectors.

An alternative approach is to, instead of imposing a routing information distribution hierarchy, rather divide the AS into "confederations". IBGP is then used within each confederation while a variant of EBGP is used between confederations. The use of confederations causes problems similar to those caused by the use of route reflectors.

Improved systems and methods for distributing interdomain routing information within an AS are thus needed. Improvements are needed that will simultaneously provide scalability, efficient use of processor and memory resources, avoidance of forwarding loops, consistency of routing information across the AS, improved speed of network convergence, etc.

SUMMARY OF THE INVENTION

Embodiments of the present invention provide improved systems and methods for distributing interdomain routing information within an Autonomous System (AS). A protocol extension to BGP, iBGPd (internal Border Gateway Protocol downloader), has been developed to replace IBGP in distributing BGP interdomain routing information within an AS. The iBGPd technique distributes routing information hop-by-hop using a reliable multi-party transport protocol. Scalability is greatly improved since the use of a full mesh of TCP connections is avoided. Also, there are improvements in routing information propagation delay and routing stability. Drawbacks related to the use of route reflectors and confederations are avoided.

A first aspect of the present invention provides a method for distributing routing information within an autonomous system from a border router of the autonomous system. The method includes: establishing a multi-party transport protocol session wherein the border router is a session source and there are receivers of the session that are nodes of the autonomous system, receiving exterior border gateway protocol (EBGP) routing information from nodes outside the autonomous system, processing the EBGP routing information to develop internal border gateway protocol (IBGP) routing information, and distributing the IBGP routing information as a part of the multi-party transport protocol session via a distribution tree including the receivers.

A second aspect of the present invention provides a method of operating a router in an autonomous system. The method includes: identifying a next-hop router toward a source of a multi-party transport protocol session, sending a join message to the next-hop router to participate in the multi-party transport protocol, receiving border gateway protocol (BGP) information from the next-hop as a part of the multi-party transport protocol session, and updating a router information base (RIB) based on the received BGP information.

Further understanding of the nature and advantages of the inventions herein may be realized by reference to the remaining portions of the specification and the attached drawings.

BRIEF DESCRIPTION OF THE DRAWINGS

FIG. 16A depicts replacement of old ADUs according to one embodiment of the present invention.

DESCRIPTION OF SPECIFIC EMBODIMENTS

Embodiments of the present invention will be described with reference to a particular implementation of an internal Border Gateway Protocol downloader (iBGPd). IBGPd is used to distribute routing information from border routers of an Autonomous System (AS) to interior routers of the AS. In common with IBGP implementations, BGP routing information is transferred for individual destination networks as identified by a network address "prefix." Each prefix is denoted by a destination network address and a mask which indicates how many of the most significant bits of the address form the prefix to be used for matching purposes. Transferred routing information will pertain to a particular prefix. A particular routing information item may specify an available path to a prefix in the form of a next-hop router address usable to reach that prefix and may further include one or more other BGP "attributes." Attribute syntax and semantics are discussed in detail in the BGP specifications and will not be fully presented herein. A routing information item may also withdraw path information for a particular prefix.

IBGPd propagates information hop-by-hop along the actual network topology calculated by the IGP and is adaptive to topology changes internal to the AS. IBGPd can be used in, e.g., two different basic configurations:

1. Border routers wishing to advertise reachability for interdomain prefixes can use iBGPd to distribute within the AS the mapping between prefixes and themselves as exit points. In this configuration the information distributed does not contain any of the BGP attributes associated with the routes. Border routers of the AS still need to communicate through IBGP connections to exchange full route and attribute information so that they can run the BGP bestpath algorithm and decide on the winning routes that are to be distributed with iBGPd.

2. IBGPd can be used to completely replace IBGP within the AS. In this configuration border routers use iBGPd to distribute complete routing information (winning routes and their associated attributes).

In order to distribute the BGP routing information, iBGPd uses the services of the RPF Multi-party Reliable Transport (RMRT) protocol as described herein.

Before describing the iBGPd application in greater detail, RMRT operation will now be described.

RPF Multi-Party Reliable Transport

RMRT provides reliable database distribution services to nodes of an IP network. RMRT refers to Reverse path forwarding Multi-party Reliable Transport (RMRT). Each RMRT session is established between a single server application on a source router and a set of client applications each on a receiving router. The server and client applications may be iBGPd applications.

Figure 1:
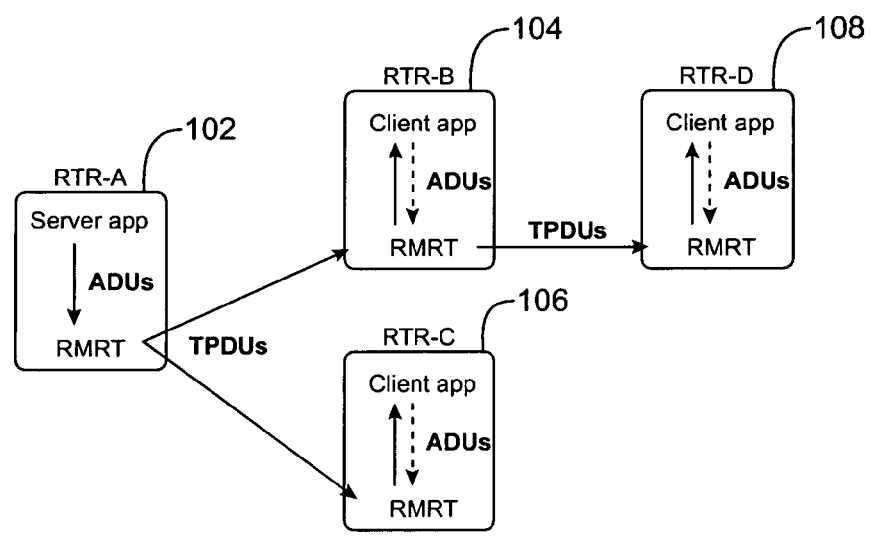
FIG. 1 depicts hop-by-hop propagation and delivery to applications of database contents according to one embodiment of the present invention.

FIG. 1 depicts hop-by-hop propagation and application delivery in RMRT according to one embodiment of the present invention. In FIG. 1, a router 102 is the session source and database updates are distributed to clients operating at receiver routers 104, 106, and 108. In RMRT, the server application on source router 102 provides data to be transported in a series of application data units (ADUs). Each ADU generated by the server application is associated with a sequence number. RMRT builds transport protocol data units (TPDUs) which are packets containing one or more ADUs. The TPDUs are propagated hop-by-hop through the network by routers participating in the RMRT sessions.

In RMRT, in the embodiment now being described, all routers that are used to propagate TPDUs through the network also participate as receivers in the RMRT session. Also, when a participating router receives new TPDUs it delivers the contained ADUs in sequence order to a local client receiving application.

As shown in the simple example of FIG. 1 an RMRT session transfers information via a distribution tree. Each RMRT participant (other than the source) has one upstream neighbor on the tree and may also have one or more downstream neighbors. Each RMRT participant may be an upstream endpoint for multiple associations. However, each RMRT receiver has only one upstream router. In accordance with embodiments of the present invention, UDP (or some other unreliable datagram protocol) is used to propagate the TPDUs between routers. An unreliable datagram protocol (as opposed to a reliable one such as TCP) is preferred because RMRT includes its own retransmission mechanism as will be explained. Each RMRT session participant may share retransmission buffering capacity among multiple downstream receivers, a great improvement over the use of multiple TCP connections.

During steady state operation, each non-source participant performs three basic tasks:

1. Receive RMRT TPDU packets transmitted by the upstream neighbor router.
2. Extract ADUs from the TPDUs.
3. Deliver the ADUs to the local application.
3. Construct and propagate TPDUs to downstream neighbors on the tree.

Distribution tree connectivity is based on reverse path forwarding (RPF), a technique typically used for multicast routing. A router wishing to join an RMRT session and connect itself to the session's distribution tree relies on unicast routing protocol information to establish connectivity to the source. It is assumed that participating routers operate a unicast routing protocol such as IS-IS, OSPF, or EIGRP as are known in the art. The participating router is assumed to be aware, through preconfiguration for example, of the IP address of the session source. The RMRT receiver uses the unicast routing protocol information to find a path to the source and the next-hop router on this path. Forwarding of TPDUs will occur on this path, only in the reverse direction from the one envisioned by the unicast routing protocol. Thus the router which is the unicast next-hop toward the source is the previous-hop on the RMRT distribution tree.

Having determined the previous-hop towards the source, an RMRT receiver receives all TPDUs and requests all retransmissions from that router. The RMRT receiver's determination of the previous-hop is dynamic and tracks changes in the connectivity information provided by the unicast routing protocol. Switching between different previous-hops in the same RMRT session is transparent to ADU reception because all RMRT routers participating in a session maintain the ADU to sequence number mapping that was originally assigned on the source router.

The TPDUs are transmitted using UDP/IP best-effort datagram service. When a receiving router misses one or more TPDUs all necessary retransmissions are provided by the immediate previous-hop rather than by the source.

In one embodiment, RMRT uses a NAK-based mechanism to request retransmissions. RMRT does not have to buffer ADU data in order to be able to retransmit it. Rather, it can rely on the resident application being able to reproduce ADUs on demand when presented with their sequence number. Based on application-specific parameters, the application itself can decide on the amount of ADU sequence history it is willing to maintain in order to serve retransmissions. If the amount of history is not sufficient to rebuild the required retransmission packets then RMRT has the option of falling back to a full database synchronization between directly-connected neighbors. Also, to improve efficiency, RMRT may maintain its own cache of previously transmitted ADUs.

Figure 2:
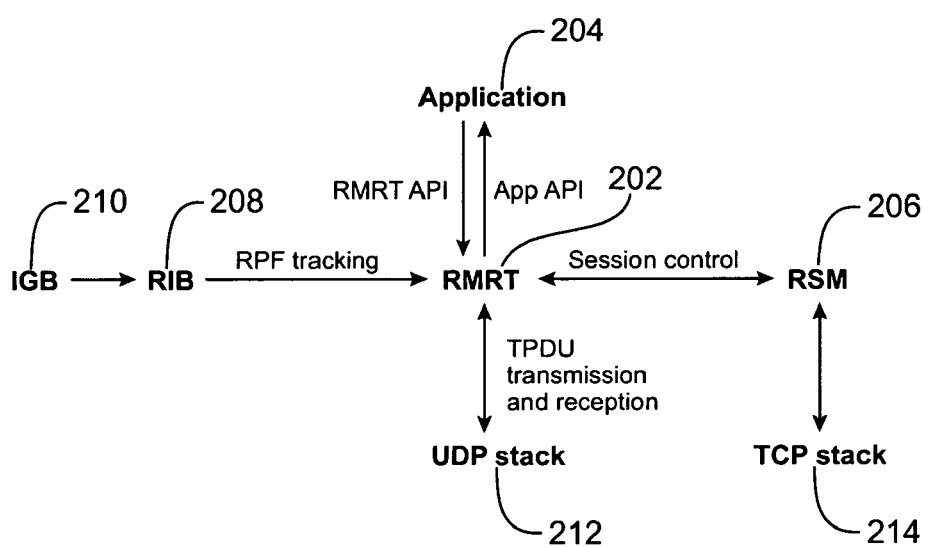
FIG. 2 depicts interaction between a transport layer module and other router software components according to one embodiment of the present invention.

FIG. 2 depicts interaction between an RMRT module 202 and other router software components according to one embodiment of the present invention. FIG. 2 shows RMRT module 202, an application 204, an RMRT session manager (RSM) 206, a routing information base (RIB) 208, and a unicast routing protocol component 210 that operates an IGP such as, e.g., OSPF, IS-IS, etc. There are also interactions with the UDP stack 212 and TCP stack 214 of the router.

An application program interface (API), as will be described below, is used for interactions between RMRT module 202 and application 204. The API is used to exchange ADUs and for the RMRT to request previously transmitted ADUs for the purposes of retransmission and synchronization. RMRT learns of the path to the source through RIB 208 which is in turn populated by the unicast protocol component 210. RSM 206 provides control channel services to communicate session control information with directly-connected neighboring routers including Join and Prune messages. The TPDUs themselves are transmitted and received via the UDP stack 212. RSM 206 uses TCP stack 214 to maintain the control channels.

Figure 3:
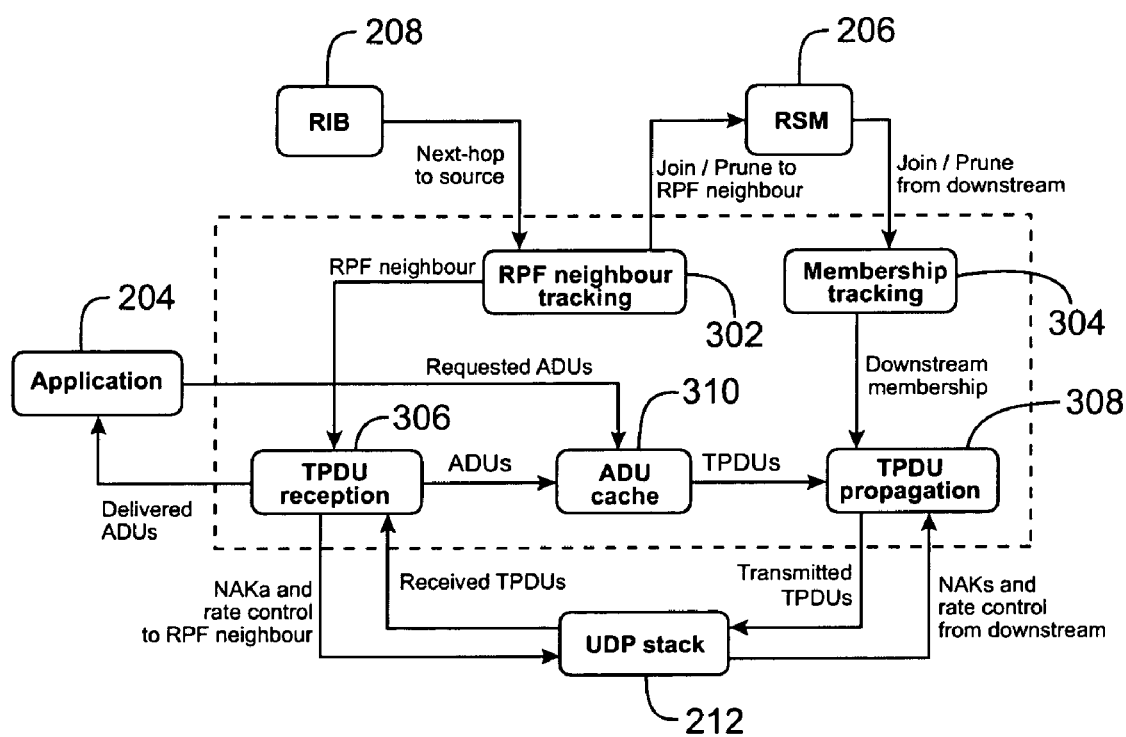
FIG. 3 depicts internal structure of a transport layer module according to one embodiment of the present invention.

FIG. 3 depicts the internal structure of RMRT module 202. RPF neighbor tracking component 302 interacts with RIB 208 to determine the directly-connected node on the path upstream towards the RMRT session source. The RIB has of course been previously populated by the unicast routing protocol operating on the receiver router. Membership tracking component 304 processes Join and Prune messages from downstream directly-connected nodes via the RSM control channel. This received information is used to maintain the downstream membership database, i.e., the nodes to which received TPDUs will be forwarded.

A TPDU reception component 306 processes incoming data and delivers it to the application while also dealing with detection of lost TPDUs and responding by making any necessary retransmission requests. A TPDU propagation component 308 propagates received TPDUs to the subscribing downstream directly-connected neighbors obtained by membership tracking component 304. The transmitted TPDUs are reconstructed from the received ADU information, although some implementations may typically simply copy the contents of received TPDUs and rewrite the IP source and destination addresses. TPDU propagation component 308 also responds to retransmission requests from the downstream neighbors. An ADU cache 310 stores recently received ADUs that will be needed by the TPDU propagation component. ADU cache 310 may not be strictly necessary since ADUs are available from application 204 but it may be more optimal to cache a certain number of recently transmitted ADUs.

Having identified this RPF upstream neighbor, RMRT module 202 proceeds to notify the neighbor that session data is required. RPF neighbor tracking component 302 invokes RSM 206 to send a Join control message upstream to the upstream neighbor. This is transmitted using the RSM control channel. Membership tracking component 304 receives Join and Prune messages from downstream routers and maintains the list of neighbors to which TPDUs will be propagated.

RPF neighbor tracking component 302 continually monitors RIB 208 to always know which node is the unicast next-hop neighbor (previous-hop on the RMRT distribution tree) toward the source. Network topology changes discovered by the unicast routing protocol may result in a change of next-hop toward the session source. When there is such a change, RPF neighbor tracking component 302 invokes RSM 206 to send a Prune message to the old unicast next-hop neighbor to indicate that session forwarding from the former next-hop is no longer required. Also, RPF neighbor tracking component 302 invokes RSM 206 to send a Join message to the new unicast next-hop node.

It will be appreciated that for a session source, ADUs are only obtained from the application and not delivered to the application. Also, the session source does not select an upstream neighbor but does track downstream membership like any other session participant.

For all the ADUs propagated from the session source to the participating receivers, a consistent sequence number space is used. At the session source, each ADU generated by the server application is assigned a new sequence number by, e.g., either the application or by RMRT. The mapping between the sequence number and the ADU is included in the constructed TPDU packets and communicated through the session receivers. When a receiving router delivers the ADU to the resident client application, the associated sequence number is also communicated. Receiving applications maintain this mapping to assist RMRT in its operation. After having delivered an ADU to the client application, the RMRT module may request the ADU back for retransmission purposes by specifying its sequence number.

ADU sequence numbers are assigned from a finite space that may be exhausted during the lifetime of an RMRT session. RMRT deals with the possibility of exhaustion by allowing the sequence space to wrap.

To avoid ambiguity among multiple ADUs sharing the same sequence number following wrapping, ADUs are disassociated from the sequence members long before the sequence numbers are reused. This disassociation occurs at the very latest when a new ADU is assigned a sequence number halfway across the sequence space from an old ADU.

Figure 4:
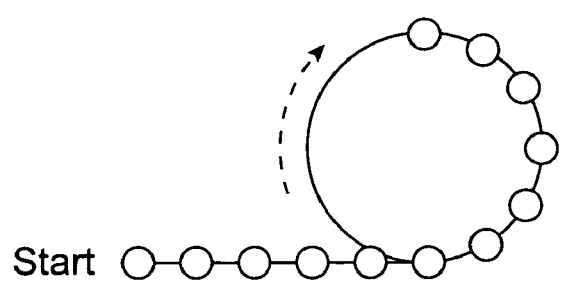
FIG. 4 depicts the use of application data sequence numbers according to one embodiment of the present invention.

FIG. 4 depicts the sequence number disassociation process according to one embodiment of the present invention. The black dots represent ADUs. The rotating circle represents the sequence number space. ADUs on the flat line (outside the circle) represent old ADUs for which the sequence number association is no longer maintained. The sequence number of the ADU at the bottom of the circle is retired as soon as the sequence number at the top of the circle is assigned. In this way, it is assured that a single sequence number represents only a single ADU at any one time. This disassociation process occurs across all the routers participating in the RMRT session.

The consistent sequence numbering of ADUs across all routers participating in a session allows the RMRT component to avoid unnecessary ADU buffering. Once an ADU has been delivered to the local application RMRT can retrieve it through the API provided by the application using the ADU sequence number as a key. As a result, to support TPDU propagation and retransmission, all ADUs could be obtained from the applications database.

Figure 5:
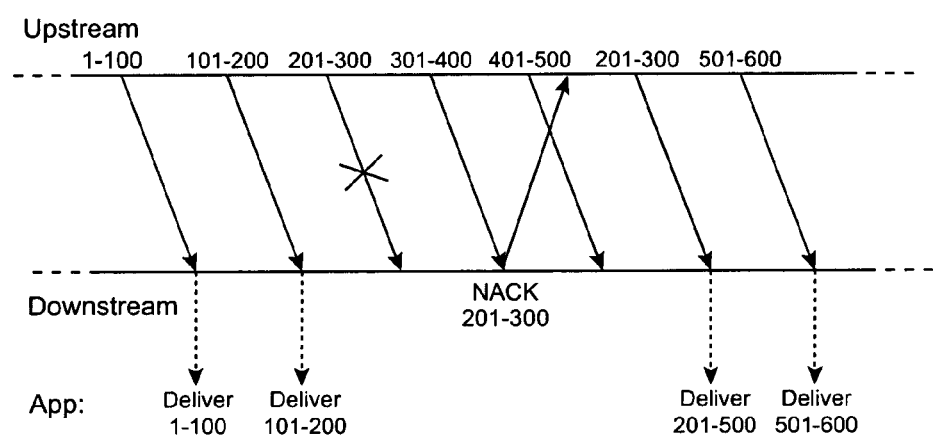
FIG. 5 depicts selective loss retransmission and in-order application data unit delivery according to one embodiment of the present invention.

Since unlike TCP, UDP does not include a reliability mechanism, RMRT provides for a reliability mechanism to be built on top of UDP. FIG. 5 depicts retransmission according to one embodiment of the present invention. TPDU reception component 306 tracks the received ADU sequence numbers. Any missing sequence numbers are noted as losses and result in a retransmission request to the upstream neighbor. The TPDU reception component 306 requests retransmission by sending a negative acknowledgement (NAK) encapsulated within a UDP datagram.

A missing ADU is detected when the next TPDU packet is correctly received and the gap in the received ADU sequence members is noticed. This is achieved by comparing the starting ADU sequence number in the latest TPDU to the last correctly received ADU sequence number.

Each NAK packet includes a list of ranges of ADU sequence numbers that are missing. Upon receipt of a NAK, the upstream neighbor suspends current ADU propagation and instead prioritizes retransmission of the missing ADUs. New TPDUs may be constructed for retransmission purposes. The ADUs may come from ADU cache 310 or they may be requested from the application. When all of the missing ADUs have been retransmitted, transmission of current ADUs is resumed from the point where it left off.

To improve the speed of loss detection during silent periods, dummy TPDUs are transmitted. Dummy TPDUs contain no real ADU data and just convey the last transmitted ADU sequence number to allow receivers to realize that they have missed one or more previous ADUs.

Figure 6:
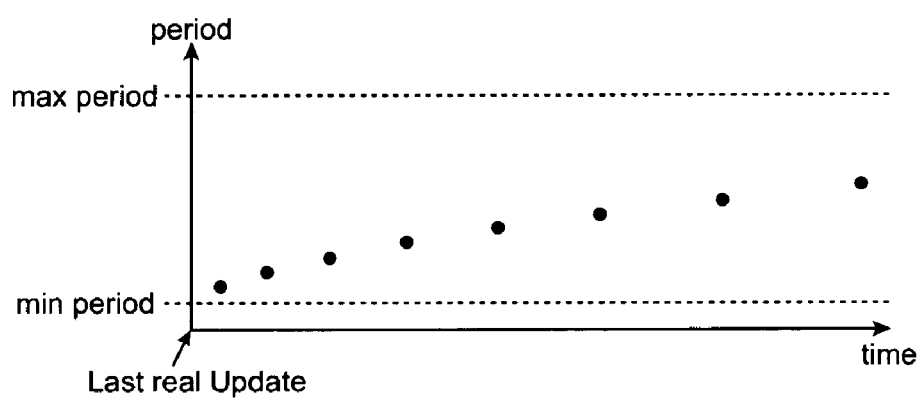
FIG. 6 depicts spacing of dummy application data units according to one embodiment of the present invention.

FIG. 6 depicts the transmission spacing of dummy ADUs after the beginning of the silent period according to one embodiment of the present invention. The transmission rate decreases exponentially with time as the silent period continues. No dummy TPDU messages are sent while normal TPDUs are being regularly transmitted. The transmission rate for dummy TPDUs is controlled separately at each transmitting router.

Some embodiments may also incorporate a low frequency periodic positive acknowledgement mechanism. Receipt of a NAK from a downstream router can be used to deduce the earliest sequence number in the session before which the downstream has currently received all ADUs. However, while all ADUs are being received correctly, no NAKs are issued. Use of a positive acknowledgement may allow a session participant to safely discard known correctly received ADUs from its cache.

Also, when a positive acknowledgement is received indicating the last transmitted ADU before a silent period was correctly received, there is no reason to conduct dummy TPDU transmissions. Thus, positive acknowledgements (ACKs) may be sent at a configurable frequency by each session member to its upstream neighbor. Each ACK contains the ADU sequence number of the first ADU up to which all session ADUs have been correctly received. Transmission of periodic ACKs takes place only while there is TPDU activity from the upstream neighbor and while no NAKs are being issued.

It is possible for a receiver RMRT session to be missing an ADU whose retransmission cannot be requested by specifying its sequence number. The ADU can either have been dissociated from its sequence number or deleted from the upstream router database. This can happen in, for example, two cases:

1. When a new receiver joins a session and the session has been active for long enough that ADUs with no associated sequence number may already exist.
2. If the network becomes partitioned during the session, receivers that are disconnected from the source will have no way of receiving ADUs. If this partition persists long enough for half the sequence base to be exhausted, the missing ADUs will become disassociated from their sequence number.

Embodiments of the present invention provide for an RMRT database synchronization process to bring receivers in these two cases up-to-date with the session. The synchronization process is invoked by an upstream router when it receives a retransmission request from the downstream router that it cannot service due to disassociation of the requested ADUs from their sequence numbers. During synchronization, a complete transfer of the application database occurs without interfering with regular ADU propagation.

The synchronization process relies on cooperation between the RMRT component and the local application. Synchronization is achieved by transferring the complete contents of the session ADU database. This database includes all ADUs that are no longer associated with a sequence number but are still needed to reconstruct the current global state of the application database. These ADUs are still stored by the application in order albeit without their sequence numbers. The database also includes the ADUs that still have a sequence number association and are thus stored with their associated sequence number either by the RMRT component or by the application. After synchronization, the recovering router will have all the ADUs that were originated by the session source over the session lifetime. The ADUs are communicated and delivered to the local application and the recovering router in the order in which they were originally generated. In addition to the ADU data, the existing ADU sequence number associations are transferred so that the recovering router can become a full session participant.

During synchronization, the application is configured to transmit the database contents under its control at the direction of the RMRT module. To facilitate this control, the application programming interface (API) between the RMRT module and the application includes two special up-calls. One up-call initiates a walk through the database. The walk is identified with a handle so as to differentiate among walks that may be taking place in parallel due to simultaneous synchronization sessions to different downstream clients. Once a walk is established, another up-call is invoked to obtain the next ADU from the application's database. Each time this call is invoked, the application provides the next ADU in the order in which they were originally generated by the session source. For ADUs that still have a sequence number association in the application database, the sequence number is also provided to RMRT.

There may also be up-calls provided to facilitate rewinding and fast forwarding within the same walk. The support for rewind and fast forwarding allows the RMRT component to avoid buffering ADU data obtained during a walk until it is certain that the data has been correctly received and delivered to the application on the downstream router receiving the synchronization.

At the router receiving the synchronization, processing of ADUs is quite similar to processing during normal session participation. Essentially the only difference is that during the early part of the synchronization session, ADUs delivered to the application will not be associated with a sequence number. Sequence numbers will become available when the synchronization process enters the part of the upstream router's database that still has sequence numbers associated with the ADUs. A variety of techniques can be used to actually transfer database contents during the synchronization process. For example if the rewinding forwarding up-calls described above are available, then a private RMRT session between the two routers may be used to transfer the data. This minimizes the need for transport buffering overhead on the upstream router supporting the synchronization. If there is no rewind capability, a TCP connection may be used.

It is desirable to employ flow and congestion control in conjunction with the use of RMRT. In one embodiment, RMRT employs Datagram Congestion Control Protocol (DCCP) as described in Kohler, et al., "Datagram Congestion Control Protocol", IETF Internet Draft, March 2003, the contents of which are herein incorporated by reference for all purposes in their entirety. DCCP is a lightweight protocol that provides congestion control and flow control to applications that do not require reliability or provide their own reliability mechanism. RMRT may employ DCCP instead of UDP. DCCP establishes a bi-directional flow of information. The reverse path (from the downstream to the upstream) can be used by the RMRT component to convey the negative acknowledgements. Also, advantageously, DCCP has minimal header and protocol state overhead.

ADU cache 310 may be exploited to accommodate multiple transmissions of the same ADUs when required by either flow control or congestion control. The use of ADU cache 310 for these purposes and for retransmission is reasonably efficient since the cache is shared among all downstream receivers. The cache size is configurable depending on the impact of requests to the application.

RMRT provides the following call to the application:

RMRT_ADU_notify(new_ADU_count) Used by the server application on the source router to notify the RMRT component of newly available ADUs. RMRT may return the sequence number that is to be assigned to the first ADU or the application itself may provide it.

The application provides the following up-calls to RMRT:

app_ADU_request (sequence_no)
Used by RMRT to request a specific ADU from the application. The application returns the ADU or an error if the requested ADU sequence number is not in the history maintained by the application app_ADU_receive (ADU, sequence_no)
Used by RMRT on routers that are receivers of a session to deliver a correctly received ADU to the client application.

app_sync_parent_init ( )
Used by RMRT to notify the application that it is initiating a new synchronization process with a downstream neighbor. The application returns a handle that RMRT should use on all subsequent calls related to this synchronization process.

app_sync_parent_done (sync_handle)
Used by RMRT to notify the application that the synchronization process has completed and that it may discard any associated state.

app_sync_parent_ADU_next (sync_handle)
Used by RMRT during the database synchronization process to obtain the next ADU in the application database. The application returns the ADU as well as its sequence number if it is associated with one. If the synchronization process reaches the end of the database then no ADU is returned.

app_sync_parent_ADU_rewind (sync_handle, ADU_count)
Used by RMRT during the database synchronization process to instruct the application that a rewind in the walk by a number of ADUs is required.

app_sync_parent_ADU_fwd (sync_handle, ADU_count)
Used by RMRT during the database synchronization process to instruct the application that a forward jump in the walk by a number of ADUs is required.

app_sync_child_reset ( )
Used by RMRT to inform the application that it is about to receive a database synchronization.

app_sync_child_done(history_base)
Used by RMRT to inform the application that the synchronization process is complete and to provide the ADU sequence number after which no disassociation has taken place.

RMRT session manager (RSM) 206 is responsible for coordinating a set of RMRT sessions (one or more) belonging to the same application. From the perspective of a particular router in a network using RMRT the resident application may be the originator of multiple sessions a swell as a member of multiple remotely originated sessions. The capability of applications on different routers to originate sessions provides support for multi-way communication through RMRT. The ability for an application in a single router to originate multiple RMRT sessions provides support for communication of different classes of information. Coordinating sessions belonging to the same application has two advantages:

1. Coordination enables more efficient use of router and network resources. More specifically:
    a. A RMRT speaker needs to exchange session control information with its directly connected neighbors. An RSM reliable control connection based on TCP is used in this exchange. Control messages belonging to different RMRT sessions for the same application share the RSM connection between each pair of directly connected participating routers.
    b. An application may use a large number of RMRT sessions to classify information with different receiver membership. When a receiving router is joining two or more sessions through the same RPF neighbor, the UDP packets used to carry TPDUs can be used to multiplex TPDUs belonging to different sessions.
    c. Similar to TPDU multiplexing, adjacent routers can bundle NAKs belonging to different sessions in the same UDP packet. In fact TPDUs and NAK for sessions heading in opposite directions between a pair of neighbors can be combined in the same packet.
    d. When a router restarts or recovers from a network outage it may have to synchronize the contents of its application database. In an application with many RMRT sessions it is likely that more than one of the synchronization sessions will be obtained through the same RPF neighbor. Just like sharing is achieved with the RSM control connection, a single synchronization TCP connection can be established between the two routers for the transfer of data belonging to multiple synchronization sessions.

2. Coordination of multiple sessions enables dynamic network configuration:
    a. RSM provides a hello protocol that enables directly connected neighbor auto-discovery. The application has the option of manually specifying a list of valid neighbors or having them discovered through RSM.
    b. RSM can be used by a router originating a session to advertise the existence of the session to potential receivers. Knowledge of the session is flooded to all potential receivers that can then decide whether to join it or not. A router originating a session can distribute an application specific session description with the session announcement. The session description can be used by potential receivers to determine their interest in receiving the session.

Each application using RSM and RMRT should select a well-known RSM TCP control port as well as a well known TPDU UDP destination port. The TCP and UDP ports are used to de-multiplex between different applications using RMRT and allow neighboring routers running the same application to talk between them.

An application using multiple RMRT sessions should have a way of addressing them. RSM and RMRT use a common session identification mechanism consisting of two pieces of information:

1. The IP address of the router originating the session.
2. A session ID assigned by the resident application on the router originating the session. This ID is used to distinguish the session from other sessions originated by the application on the same router.

RMRT is designed to reliably distribute a database in a network of routers where every router is participating as a session receiver. However, according to embodiments of the present invention, RMRT may be extended to allow for routers that do not wish to receive session data to nonetheless support RMRT implementation in the network by acting as transit routers.

A RMRT transit router has a software component structure similar to what has been illustrated and described above but there are a number of differences compared to a RMRT session participant:

- As the transit router is not a regular session member, it only participates in a session when a full downstream participant joins through it. When there are no downstream members that require session data forwarding the transit router does not join.
- In an RMRT transit router, the resident application is not interested in ADU data. As a result received ADUs are not delivered to the application and can therefore not be re-obtained through it.
- A RMRT transit router relies on its local cache for storing ADUs that need to be propagated downstream. Any required ADUs that are not present in the cache must be requested from the upstream router.
- A RMRT transit router does not perform the services of a synchronization parent as it does not store the complete session database. It therefore redirects downstream routers requiring a synchronization to obtain it from a full participant further upstream.

Figure 7:
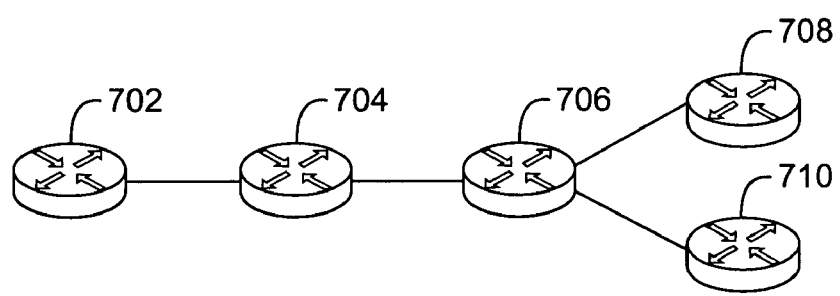
FIG. 7 depicts use of a transit router in a multi-party transport protocol according to one embodiment of the present invention.

FIG. 7 depicts a simple RMRT scenario involving use of a transit router. There is a session source 702, a receiver 704, a transit router 706, and two additional receivers 708 and 710. The following sequence of events takes place:

1. A receiver 704 is adjacent to source 702 and joins it directly whereas receivers 708 and 710 send Joins for the session to RMRT transit router 706.
2. Transit router 706 realizes it should forward the session and sends the Joins towards the source through receiver 704.
3. Receiver 704 accepts the Join from the transit router 706 just like it would accept that of a regular member and starts forwarding TPDUs.
4. Transit router 706 propagates the TPDUs possibly storing the contained ADUs in its local cache.
5. Upon receipt of the first TPDU, the receivers 708 and 710 notice that they are missing earlier session ADUs that were originated before they joined the session. They therefore send a NAK to transit router 706 indicating the ADUs it needs to retransmit.
6. Transit router 706 does not have the requested ADUs stored locally as the resident application is not receiving data. It therefore records the range of ADUs that are missing from each downstream receiver and sends a NAK to receiver 704 requesting them.
7. Receiver 704 reproduces the ADUs from its local application database and sends them in TPDUs to transit router 706.
8. Transit router 706 propagates the ADUs to receivers 708 and 710.

Receivers 708 and 710 have now caught up and continue to participate normally in the session. TPDU losses are handled as follows:

1. Receiver 708 experiences a TPDU loss. When the next TPDU arrives it realizes that there are missing ADUs and it issues a NAK to transit router 706.
2. Transit router 706 receives the NAK and since it recently propagated the ADUs they are also stored in the local RMRT cache. The transit router uses the cached ADUs to create a TPDU which it sends to receiver 708.

The example above has shown how a transit router appears just like a regular participant to both its upstream neighbor as well as to the downstream members. In fact any number of RMRT transit routers and regular participants can be mixed in any order between a RMRT session source and a receiver. There is also no special treatment required with RPF neighbor changes. This is true both when the transit router itself changes the neighbor from which it is receiving the session as well as when a downstream participant of a transit router switches to join through a transit router or away from it.

Controlling the amount of data to be stored in the RMRT cache of the transit router is a tradeoff between memory resources on the transit router itself and network and processing resources between the transit router and its upstream neighbor. The cost of having a downstream member request an ADU that is not present in the transit router cache is that the transit router has to communicate with its upstream neighbor to obtain the ADU.

Reception at a transit router of NAKs and periodic ACKs (positive acknowledgements) described above can help in reducing the local ADU cache size. When a transit router confirms through NAKs and periodic ACKs that all of its downstream members have received all ADUs up to a specific ADU it advertise this ADU sequence number in its own periodic upstream ACK.

In the just-described example, the transit router had multiple downstream session participants connecting to the session through it. Having the transit router receive TPDU packets and replicate them for the downstream members as well as process NAKs from downstream improves the scalability of propagation. However, if in an RMRT session, a transit router has a single downstream member joining through it, then involving the transit router in the communication just introduces overhead.

When only a single downstream member joins the session through a transit router, then the transit router can instruct its upstream neighbor to send TPDUs to the downstream joiner without any transport layer involvement by the transit router. This situation is illustrated in FIG. 8.

Figure 8:
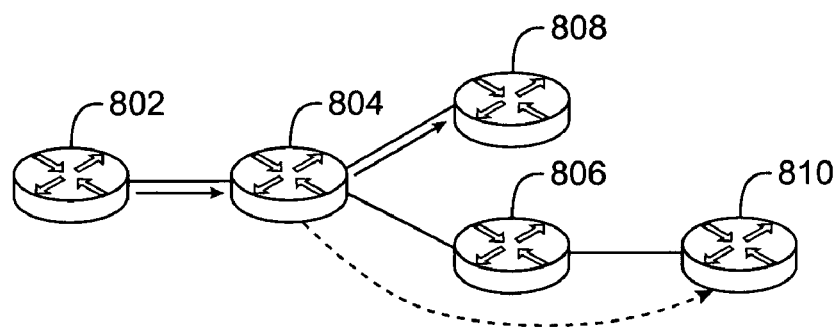
FIG. 8 depicts tunneling through a transit router according to one embodiment of the present invention.

In FIG. 8, there is a source 802, two transit routers 804 and 806 and two receivers 808 and 810. Transit router 806 has only router 810 joining through it. In contrast transit router 804 has both receiver 808 and transit router 806 joining through it. It is therefore beneficial to have transit router 804 receive and forward session data. In the case of transit router 806 it is beneficial to simply tunnel through it. The tunnelling is initiated during the join process and is adaptive to membership and network changes.

Consider the following scenario which begins before either of the receivers join the session in the example network of FIG. 8:

1. Receiver 808 joins the session through transit router 804. At this point in time receiver 810 has not yet joined the session.
2. Transit router 804 determines that since receiver 808 is the only member joining through it, TPDUs should be tunnelled through it. It contacts its RPF upstream neighbor (source 802) to join the session. While joining it specifies that TPDUs are to be sent directly (i.e., with no transport layer involvement by transit router 804) to receiver 808.
3. Source 802 acknowledges the Join and informs transit router 804 that TPDUs are going to be originated by itself (i.e., not originated further upstream and simply tunnelled through transit router 804's upstream neighbor).

4. Transit router 804 acknowledges the Join of receiver 808 and informs it that TPDUs will be sent by the source and not by transit router 804.

Receiver 808 is now participating in the session and receives TPDUs directly from source 802. NAKs from receiver 808 are also sent directly to source 802. The involvement of transit router 804 in this communication is simply to forward the TPDUs and NAKs as any other ordinary data packet.

Now, receiver 810 switches on and decides to join the session. The steps are as follows:

1. Receiver 810 sends a Join to transit router 806.
2. Transit router 806 determines that receiver 810 is the only member joining through it and decides to tunnel TPDUs and NAKs. It joins the session through transit router 804, instructing it to send TPDUs directly to receiver 810.
3. Transit router 804 receives the Join of transit router 806 and now determines that there are two downstream joiners through it (receiver 808 and transit router 806). It therefore decides to start performing the functions of the RMRT transit router for the session.
   a. Transit router 804 instructs source 802 that TPDUs are to be no longer sent to receiver 808 but instead sent to transit router 804 itself.
   b. Transit router 804 instructs source 802 that it will no longer receive TPDUs directly from source 802 but instead from transit router 804 itself
   c. Transit router 804 responds to the join of transit router 806 specifying that TPDUs will be sent by transit router 804.
4. Transit router 806 receives the join acknowledgement and notifies receiver 810 that it will be receiving TPDUs from transit router 804.

At this point session forwarding has reached the state shown in FIG. 8. Transit router 804 is participating in the session as a transit router as it has more than one downstream participant. The session is being tunnelled between transit router 804 and receiver 810 through transit router 806 since transit router 806 only has a single downstream member.

Alternatively, the threshold number of downstream members for a transit router deciding when to tunnel data through it and when to participate in a session can be set to be higher than one. A transit router can instruct its upstream neighbor to tunnel to multiple downstream members.

A router downstream of a transit router may request from the transit router the retransmission of ADUs that are no longer associated with sequence numbers in the application database of upstream routers with full session participation. When the transit router attempts to recover these ADUs from upstream, it will be notified that a RMRT synchronization process is required. However, the RMRT transit router that is functioning as the upstream neighbor of the router missing the ADUs cannot be a synchronization parent and provide the full session database. The transit router therefore redirects the downstream router to obtain the synchronization from the first fully participating router on the path towards the session source.

Figure 9:
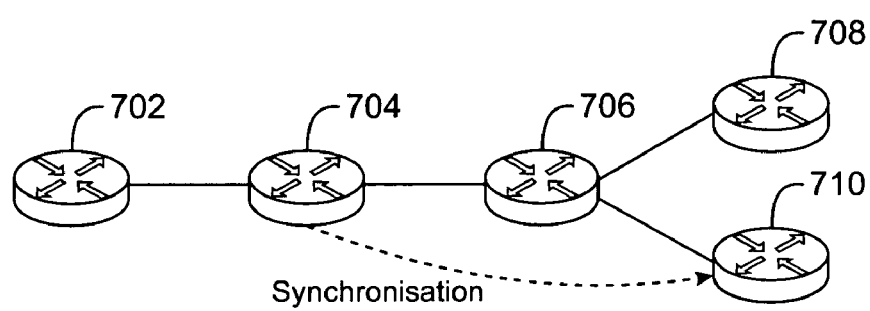
FIG. 9 depicts synchronization redirection according to one embodiment of the present invention.

FIG. 9 depicts how synchronization redirection operates in the transit router scenario of FIG. 7. The steps taken to initiate the synchronization process are as follows:

1. Receiver 710 restarts with an empty application database. It sends a NAK to transit router 706 requesting all the ADUs in the session so far.
2. Transit router 706 only has recent ADUs in its cache. It therefore propagates the NAK upstream to receiver 704 indicating that all the ADUs are required.
3. Receiver 704 receives the NAK but since the session has existed for a long period, there are ADUs in its database that no longer have a sequence number association. It therefore instructs transit router 706 through the RSM control connection that it is willing to provide a synchronization service.
4. Transit router 706 receives the synchronization offer from receiver 704 and forwards it on to receiver 710.
5. Receiver 710 directly contacts receiver 704 and synchronizes its database.

Apart from the redirection step, the synchronization connection establishment and information transfer between receiver 704 and receiver 710 remain the same as if they were directly connected.

The redirection by a transit router of downstream members requiring synchronization can become fairly inefficient in cases where the network is partitioned and then heals. This inefficiency can be eliminated by allowing the transit routers to actively participate in the synchronization process.

Figure 10:
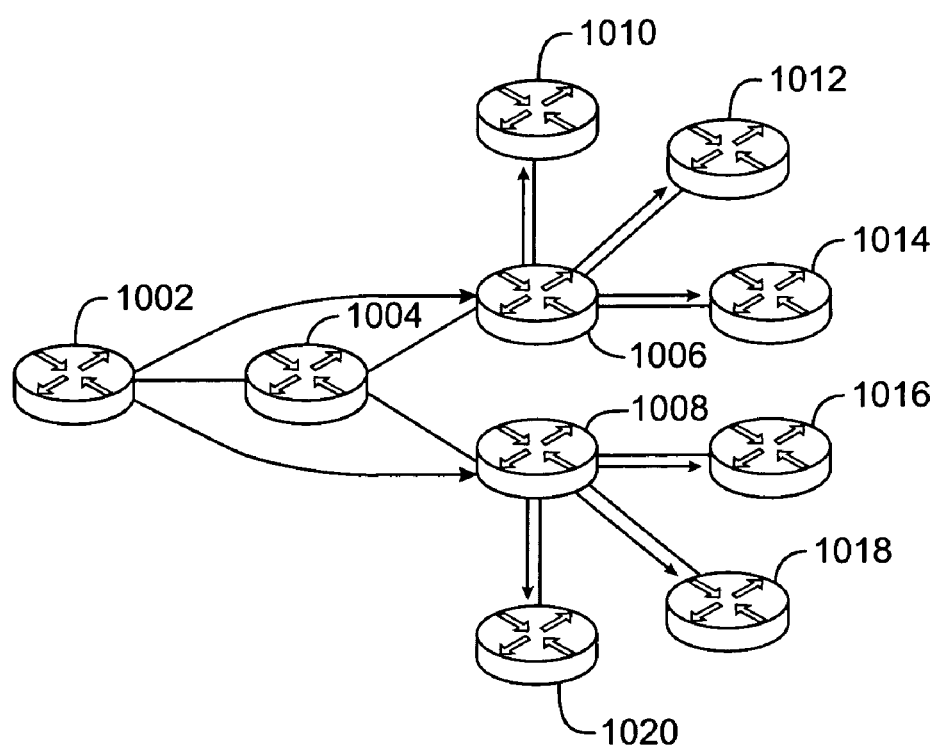
FIG. 10 depicts transit router participation in synchronization according to one embodiment of the present invention.

This scenario is illustrated with reference to FIG. 10. In FIG. 10, there is a source 1002, three transit routers 1004, 1006, and 1008 and six receivers 1010, 1012, 1014, 1016, 1018, and 1020. Consider for example the effects of a long duration failure of the link between source 1002 and transit router 1004. When connectivity is restored, if the link had been down for a sufficient amount of time then all six receivers will need to be synchronized. The normal behaviour of the transit routers 1004, 1006, and 1008 would be to redirect all the receivers to obtain the synchronization from upstream members. This would result in all recovering receivers synchronizing from source 1002. The drawbacks are:

1. Source router 1002 now originates six synchronization sessions. This requires significant processing and memory resources.
2. The links between source 1002 and the receivers will have to carry the synchronization data multiple times. In particular, network bandwidth on the link between source 1002 and transit router 1004 will be wasted since the same data will traverse six times.

A solution provided by embodiments of the present invention is to allow transit routers with multiple downstream synchronization requesters to actively forward the synchronization session. A transit router can forward a synchronization session by simply terminating a request from a number of downstream members and originating a request of its own upstream. When TCP connections for the synchronizations are established, the transit router merely copies data received in its upstream connection to all the downstream connections.

In the network of FIG. 10, transit routers 1006 and 1008 would each receive three synchronization requests from the downstream receivers. Instead of forwarding these requests upstream to transit router 1004, transit routers 1006 and 1008 can terminate the requests and originate a request of their own to transit router 1004. Since 1004 now only receives two synchronization requests (from transit routers 1006 and 1008) it can decide that it is not worth participating and simply forward them upstream to the source. Now source 1002 has only two downstream synchronization receivers and each of transit routers 1006 and 1008 have three synchronization receivers resulting in a much more scalable solution.

One consideration for the above scheme is that individual receiving routers needing synchronization are likely to stagger their requests over time. For example the request from receiver 1012 may arrive at transit router 1006 a fraction of a second later than the request from transit router 1010. One solution is to delay the propagation of synchronization requests through a transit router. However, in a network with multiple transit levels the delays would accumulate impacting recovery time.

A preferred solution is to allow a transit router that has previously forwarded a synchronization request upstream to interrupt the forwarded session and restart it through itself so that the restarted session can be shared. Before interrupting a forwarded session an inquiry into the status of the session is preferably made so that there is no interruption of sessions that have progressed past a predetermined point.

IBGPD Sessions

A single RMRT session is established for each border router wishing to be an AS egress router and forward traffic outside the AS. Application 204 for the RMRT session is iBGPd and thus the session may also be viewed as an iBGPd session. The iBGPd application on the border router acts as an RMRT server application and injects into the AS information about prefixes for which it wishes to be an AS egress router (draw traffic). All other AS routers participate in the RMRT session from that border router as receivers. The information stored and communicated through RMRT by iBGPd consists of a set of prefixes and possibly their associated attributes (depending on the mode of use). The RMRT ADU used by iBGPd is defined to be information about a specific interdomain prefix. Whenever an AS border router wishes to update the information on a prefix, it uses the next available ADU sequence number in its RMRT session to generate an ADU containing the new prefix state. Information about a prefix needs to be communicated when either of the following takes place:

1. A new prefix just became reachable through the border router and the reachability should be advertised.

2. A previously reachable prefix is no longer served by this border router and the advertised reachability information should be withdrawn.

3. If attributes are also distributed with prefixes and the attributes for a prefix change the updated information should be distributed.

In addition to the RMRT ADUs containing prefix identification information, iBGPd uses a number of control ADUs within each session:

Session parameter advertisement ADU. This is the first ADU in each session and is used to set BGP context for the session. Information contained in this ADU may include the address family for prefixes in this session or VPN parameters.

Path attributes ADUs that describe sets of attributes that are common among a number of advertised prefixes. This ADU type enables improvements in the packing of BGP prefix attributes in an RMRT session. The resulting amount of data in RMRT TPDU packets should be equivalent to the data communicated through an IBGP connection.

The sequence in which the ADUs described above are used in a regular iBGPd session is as follows. The very first ADU in a session is a Session Parameter Advertisement ADU. All following ADUs are either Path Attributes ADUs or Prefix Identification ADUs.

The Path Attributes and Prefix Identification ADUs are used to encode the path information that the border router distributes through the session. Typically a Path Attribute ADU is generated followed by one or more Prefix Identification ADUs. The Path Attribute ADU contains BGP attribute information that is common to all the prefixes identified in the Prefix Identification ADUs that follow.

Figure 15:
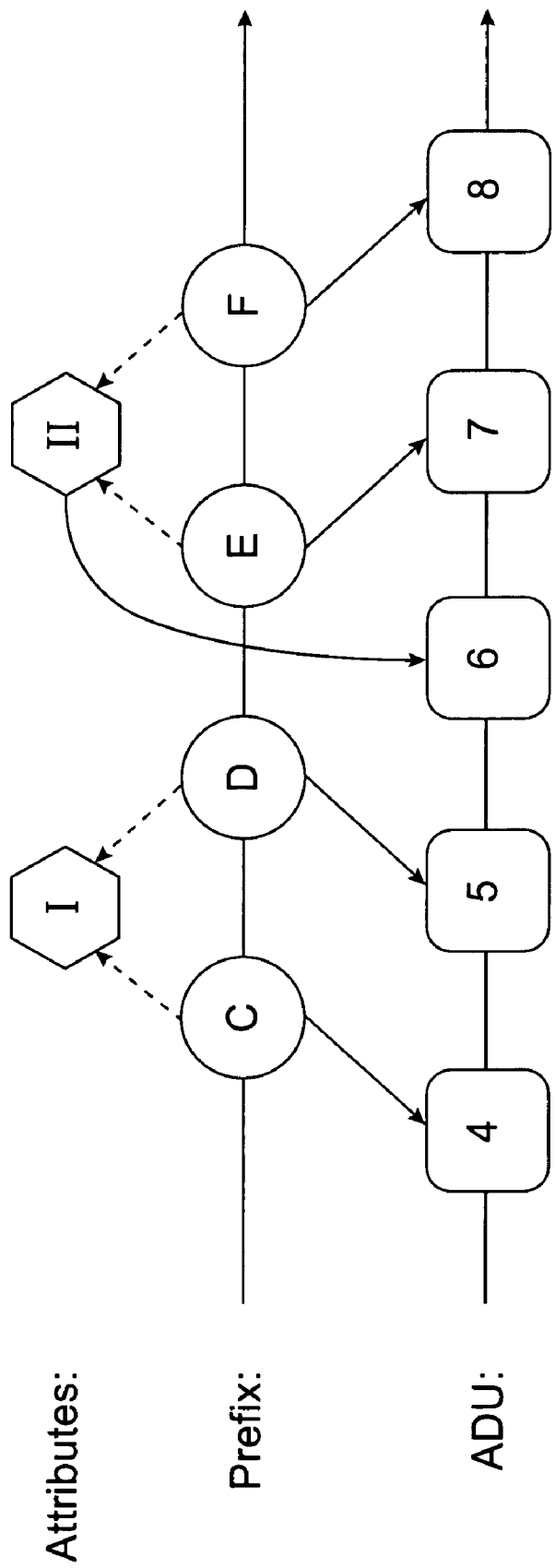
FIG. 15 depicts use of application data units (ADUs) in iBGPd according to one embodiment of the present invention.

FIG. 15 depicts ADU use according to one embodiment of the present invention. FIG. 15 shows a section of an iBGPd session during which information on four prefixes (C, D, E and F) is being communicated. The four paths do not all share the same attributes. Paths C and D share attribute set I. Paths E and F share attribute set II. The numbered boxes at the bottom of FIG. 15 represent the iBGPd session ADUs and their sequence numbers. For each communicated prefix a separate ADU is generated to identify it. In addition to the Prefix Identification ADUs there is a single Path Attributes ADU generated (ADU 6). The Path Attributes ADU is used to inform session receivers that the attributes corresponding to the prefixes that will follow (E and F in ADUs 7 and 8) are different than the attributes of previously communicated prefixes. FIG. 15 does not show the Path Attributes ADU that was generated earlier in the session to communicate attribute set I for prefixes C and D.

Figure 12:
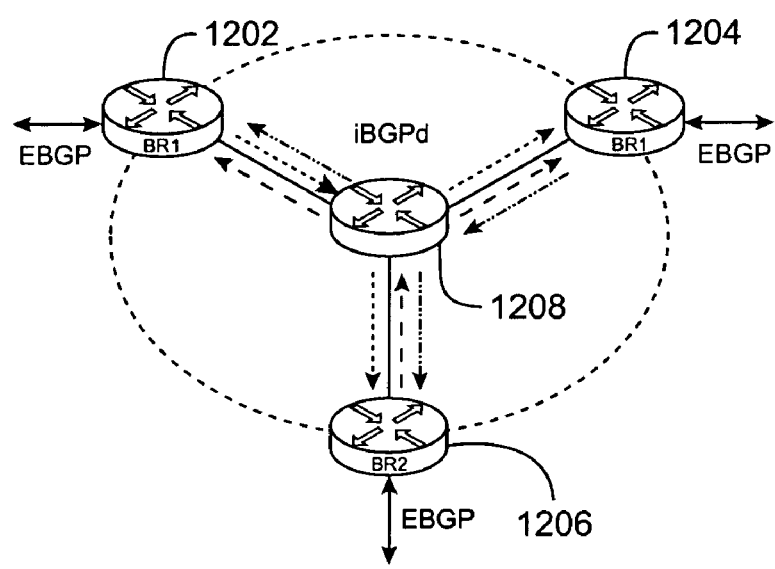
FIG. 12 depicts an internal border gateway protocol downloader (iBGPd) deployment according to one embodiment of the present invention.

FIG. 12 depicts a simplified iBGPd implementation within an AS according to one embodiment of the present invention. There are three border routers 1202, 1204, and 1206 and a single interior router 1208. The three border routers each source a session. The interior router 1208 receives all the sessions from the three border routers. Each border router receives the sessions from the other two border routers. Each border router originating an iBGPd session distributes through it reachability information for external destinations.

Apart from the common participation in the RMRT session iBGPd does not use a direct peering relationship between a border router and internal routers. Each router participating in an RMRT session is only responsible for propagating session information to its directly connected downstream neighbors. This model bounds the amount of work the router needs to do to the size of the neighbor membership and not the AS network size. Hence, iBGPd has the scalability properties of a finely tuned hierarchical route reflector deployment without the overhead of manual configuration.

With RMRT every router receives session data through a single neighboring router. The router selected to provide session data is the RPF neighbor towards the border router originating the session. As a result each iBGPd receiver only needs to receive process and store a single copy of the routing information originated by a border router. This is a significant improvement over the route reflector model where each client needs to receive multiple feeds to achieve robustness.

The resilience to failures of iBGPd is only bounded by the redundancy of the AS network. As long as there exists a path for the IGP to route between the border router sourcing a session and an internal receiver, RMRT will ensure session information is received. Reception of a session stops only if the border router sourcing the session fails or the receiver is partitioned from the network area containing the border router. In both these cases IP routing from the receiving router through the border router is impossible and the routing information for the session originated by the border router would be useless anyway.

The speed of propagation of routing information through the AS is also improved by iBGPd. An internal router receiving a session can propagate information without having to wait for its BGP component to digest it. RMRT uses a local cache for received TPDU packets that is used in propagating session data to downstream routers. This transparent propagation eliminates the BGP component delays that are present when using route reflectors thus improving the speed of internal network convergence. Transient transport memory requirements to distribute routing information are kept low since RMRT uses a shared cache for propagating session data to all downstream receivers.

Figure 13:
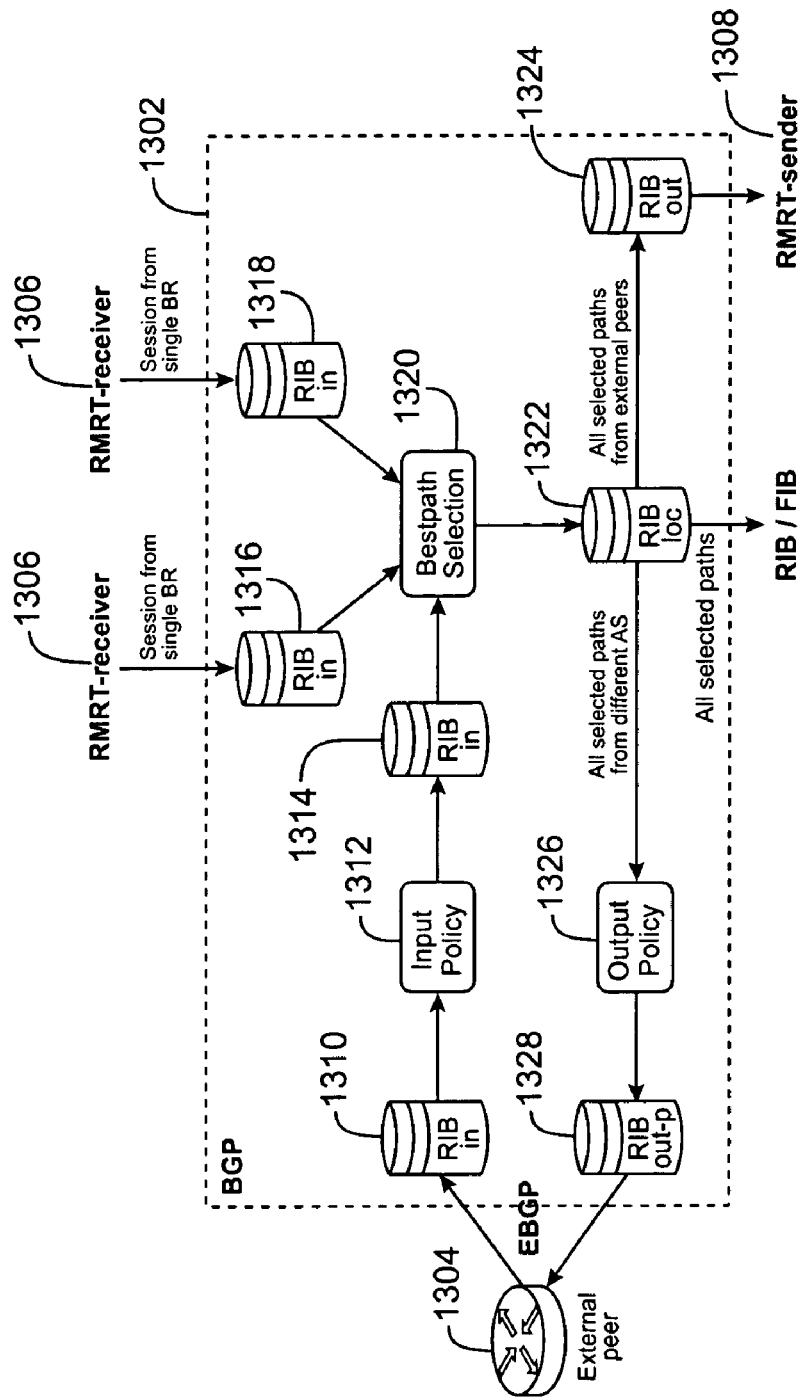
FIG. 13 depicts iBGPd data flow through a bridge router according to one embodiment of the present invention.

FIG. 13 depicts iBGPd use within a border router according to one embodiment of the present invention. A BGP component 1302 interacts with a representative peer 1304 that is external to the AS. Although only one peer is shown, BGP component 1302 may have EBGP sessions with multiple peers. BGP component 1302 also participates in multiple RMRT sessions as a receiver through RMRT receiver components 1306. The border router also acts as a source for its own RMRT session using RMRT sender component 1308.

Within BGP component 1302, dataflow is similar in many respects to that of typical BGP implementations. Routing updates from external peer 1302 are stored in a RIB-in 1310. An input policy component 1312 selects and modifies imported routing information in accordance with operative administrative policies and the results are stored in a RIB-in-p 1314. Routing updates received from the RMRT session sourced by the other border routers are fed into RIB-ins 1316 and 1318 respectively. A bestpath selection block 1320 picks winning routes from among the ones contained in all of the RIB-ins in accordance with BGP practices. The resulting picks are stored in a RIB-loc 1322. All of the contents of RIB-loc 1322 are injected into the local RIB and forwarding table (FIB) for local IP forwarding use.

External paths discovered through the EBGP connection(s) are placed in a RIB-out 1324 for injection into the locally sourced RMRT session. Each time a previously selected and advertised external path loses the bestpath selection it is withdrawn from RIB-out 1324. The withdrawal needs to be advertised through iBGPd using a new RMRT ADU. Hence, state representing the withdrawal should be maintained in RIB-out 1324. Furthermore, when two or more external paths are selected as winning paths (an EBGP multipath scenario), then they should be merged into a single path before advertisement via RMRT. Alternatively, a multipath advertisement capability could be incorporated into iBGPd to allow multiple paths per prefix in the same session.

Note that paths received via RMRT module 1306 cannot end up in RIB-out 1324 since they were not discovered through an external peer. However, they can affect the contents of RIB-out 1324 by winning over a previously selected external path and forcing it to be removed from RIB-loc 1322. All paths that originate with a different external AS than that of external peer 1304 are processed by an output policy block 1326 prior to storage in RIB-out-p 1328 and transfer to external peer 1304.

Figure 14:
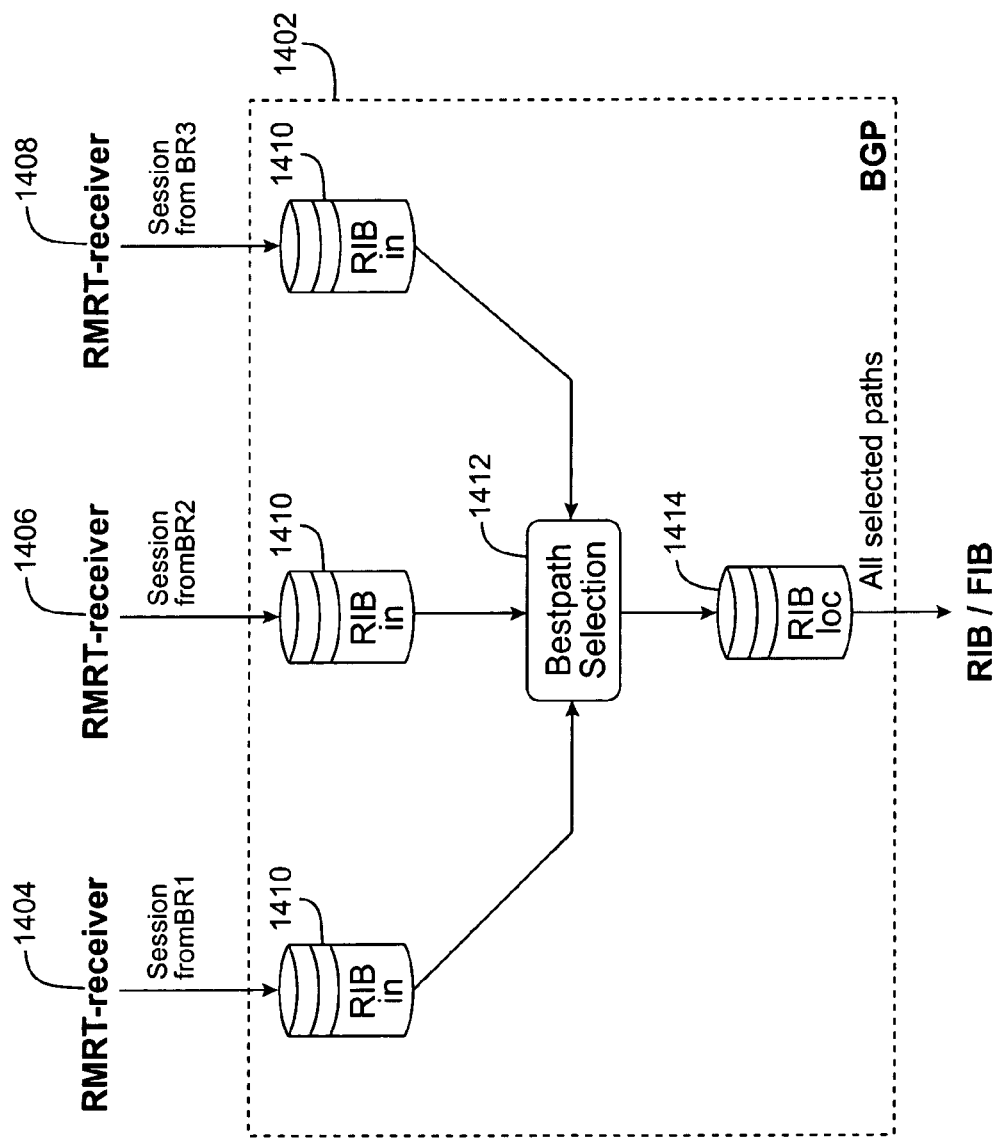
FIG. 14 depicts iBGPd data flow through an internal router according to one embodiment of the present invention.

FIG. 14 depicts dataflow through internal AS router 1208 operating iBGPd according to one embodiment of the present invention. A BGP component 1402 is simplified compared to that found in the border routers. Internal router 1208 has three iBGPd sessions and thus three RMRT sessions 1404, 1406, and 1408, one for each border router. Each of these sessions has an associated RIB-in 1410. The RIB-ins 1410 form the input to a bestpath selection block 1412. The winning paths are stored on in a RIB-loc 1414 and fed to the local RIB and FIB. Since there is no EBGP connection, internal router 1208 does not source an iBGPd or RMRT session.

The IBGPD Database

Figure 18:
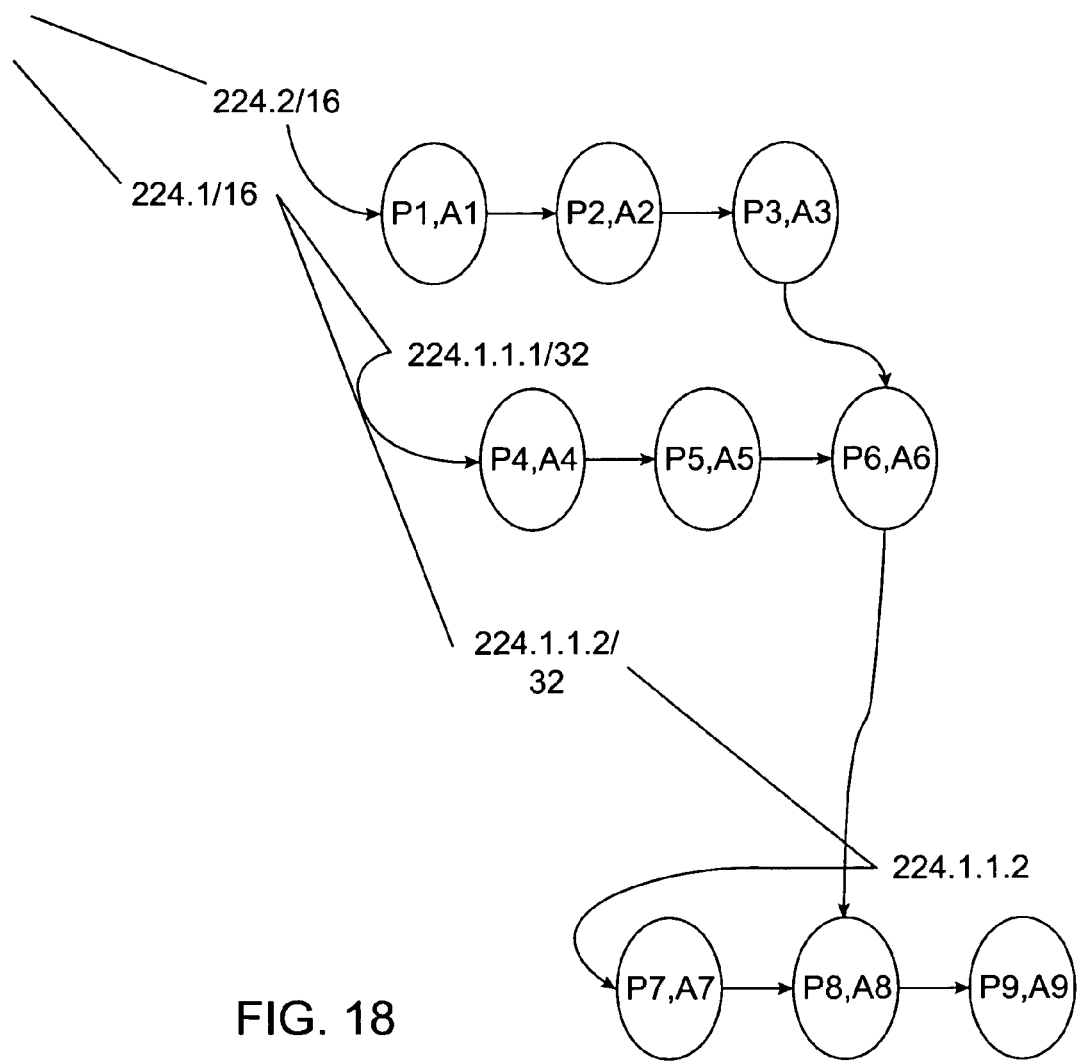
FIG. 18 depicts a data structure for storing routing information according to one embodiment of the present invention.

The various RIBs referred to in connection with FIGS. 13-14 may be stored in a unified tree structure. FIG. 18 depicts a portion of such a unified database according to one embodiments of the present invention. Each entry or "leaf" of the tree corresponds to a particular prefix as identified by address/mask. To facilitate longest match lookups the arrangement of the tree is such that the prefixes closest to the tree root have higher mask values and thus encompass broad address ranges while prefixes with lower mask values are deeper into the tree. A "child" prefix that hangs from a "parent" prefix matches to a subset of the address range matched by the parent.

Each prefix for which there is BGP routing information is annotated with a series of paths Px arranged in a linked list. Each path has an associated attribute pointer Ax which points to an attribute set. The pointer structure is used for attribute sets for storage efficiency since many attributes are common among multiple paths. There are also annotations (not shown) to indicate which one or more of the various RIBs in FIGS. 13-14 the path belongs to.

To accommodate the operation of iBGPd, paths belonging to a given iBGPd session will also be linked together in order of generation by the session source. An example of this linkage is shown for paths P3, P6, and P8 in FIG. 18. At the session source, there is one linked list for the originated session. At any session receiver there is a linked list for each received session. This linking assists in serving ADU requests from RMRT. The linking efficiently supports the following operations:

Insertion of a new prefix state with the latest ADU sequence number.

Removal of a prefix whose path was withdrawn or modified. Note that in both the removal and modification cases a new ADU will be issued in the session containing the current state of the prefix. Hence, the prefix will essentially be re-inserted in the iBGPd session RIB with its new ADU sequence number. If there is no longer a path available then the new state will simply store the fact that the prefix was withdrawn.

Lookup of recently added paths by their ADU sequence number. This operation supports the RMRT retransmission mechanism. Although RMRT typically maintains an ADU cache, it is not guaranteed to retain all ADUs that may be re-requested by a downstream router. In such a case the ADUs are obtained from the resident client application.

Traversal of the entire iBGPd session RIB sorted in the order of ADU sequence numbers. Traversal is required to support the RMRT database synchronization process.

To support these tasks, the paths are annotated with the RMRT ADU sequence number. The overall RIB data structure is thus a double-linked list.

The communication reliability mechanism in RMRT relies on the application (iBGPd) to maintain complete ADU state. RMRT may not fully buffer transmitted data and whenever retransmissions are necessary it may use the sequence numbers of the ADUs missed by the downstream neighbor to ask the local application to reproduce the associated data. Keeping full ADU history in iBGPd would mean storing in the session RIB all states of a prefix that have been communicated during the lifetime of the session. Fortunately the semantics of the communicated BGP information allow an optimization that enables iBGPd to store only the latest selected path for each prefix.

The semantics of iBGPd specify the following about information communicated during a session. An ADU received in an iBGPd session containing information for a specific BGP prefix replaces any data for the same prefix previously received from the same session source. This means that if two ADUs in the session provide reachability and path attribute information for the same prefix, the information in the newest of the two ADUs is sufficient to provide the complete current state. As a result the earlier ADU becomes obsolete and no longer needs to be stored. If the router ever needs to retransmit the no-longer-stored ADU, iBGPd can safely substitute its contents with dummy data.

Figure 16A:
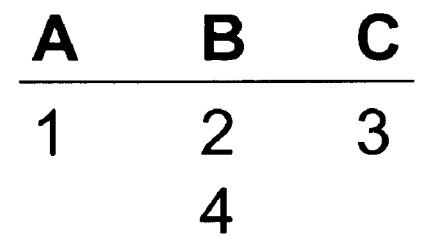

For example, assume that a border router is advertising information about three prefixes A, B and C as shown in FIG. 16A. Originally one ADU for each prefix is generated but the path information about prefix B changes and a fourth ADU is generated to update the iBGPd clients on routers receiving the session. Now a downstream router that has only managed to receive ADU 1 requests a retransmission from ADU 2 onwards. If the router providing the retransmitted data replaces ADU 2 with a dummy and correctly provides the information in ADUs 3 and 4, then the client requesting the retransmission will have received the complete current state of the database.

In order to be able to generate RMRT retransmissions the latest state for each advertised prefix and its associated ADU sequence number should be maintained by iBGPd. This includes information about prefixes that have been withdrawn by the border router. Although unlikely, it is possible that over time the amount of maintained withdrawn path state could be considered excessive. However, after an ADU has been available for a certain time, downstream neighbors will typically have caught up and will typically not require its retransmission. At that point ADU state corresponding to withdrawn paths can be purged. If at a later time a downstream neighbor requests retransmission of an ADU that has been purged a RMRT database synchronization must be initiated with that neighbor.

Figure 16B:
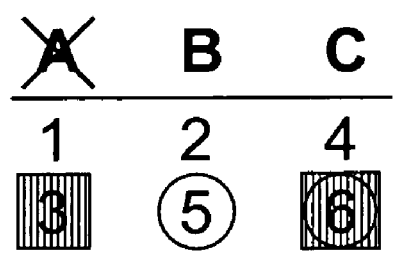
FIG. 16B depicts purging of withdrawn prefix state according to one embodiment of the present invention.

Consider the example in FIG. 16B. Six ADUs are generated for the three prefixes A, B, and C. ADUs 3 and 6 represent the withdrawal of paths for prefixes A and C respectively. To have the ability to generate any requested retransmissions for a downstream neighbor, a router should maintain state for ADUs 3, 5 and 6 that represent the latest state for each of the prefixes. In this example however, the router decides that it has maintained the withdrawal state related to prefix A (stored in ADU 3) for long enough and purges this state. It now only stores ADUs 5 and 6 and should remember that any retransmission request involving ADU 3 cannot be serviced. Any such request should result in a RMRT database synchronization.

To reduce the amount of state required in remembering which ADUs have been purged, iBGPd only stores the sequence number of the first ADU after which complete history exists. In this example this is sequence number 4. As explained above, a dummy ADU can substitute for ADU 4 since ADU 6 has updated the corresponding prefix. So a retransmission request including ADU 4 can be serviced. Any retransmission request involving ADUs 3 and lower should result in a RMRT synchronization.

The same justification used to purge the data for ADUs associated with a prefix withdrawal can be used to discard the association between the ADU data and its sequence number for any ADU that has been in the iBGPd database for a large amount of time. Even when disassociated from its ADU sequence number, the data for prefixes that have not been withdrawn should still be maintained by iBGPd. The prefix data is still needed to use in routing functions as well as when a downstream neighbor requests a RMRT synchronization. Also, as described above, RMRT requires disassociation in order to avoid ambiguity when a session sequence number wrap occurs.

IBGPd should maintain a minimum amount of ADU sequence number association history. The minimum amount required is a function of the reboot time of a router in the network. In order to prevent cascaded downstream synchronizations, when a router reboots, its upstream neighbor should keep the sequence number association for the ADUs that were missed by the rebooting router during its downtime. Routers in the downstream subtree beyond the rebooting router will have missed the same ADUs.

IBGPD Information Propagation

Figure 17:
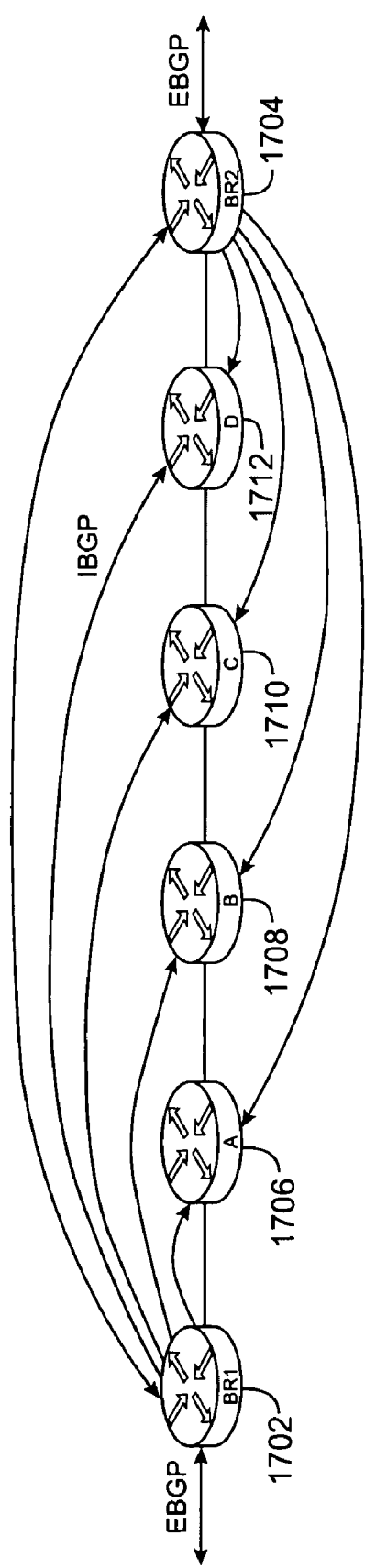
FIG. 17 depicts information propagation with a full IBGP mesh.

IBGPd provides great advantages in how routing information is propagated across a network as will now be described. The discussion will now compare iBGPd information propagation to information propagation using an IBGP mesh and using route reflectors. FIG. 17 depicts 6 routers in series in a full IBGP mesh. There are two border routers 1702 and 1704 at the edges. The routers in between 1706, 1708, 1710, and 1712 are interior routers. This simplified arrangement of routers can be thought of as a cross-section of a real AS network.

FIG. 17 shows the flow of routing information between the routers with an IBGP "full" mesh deployment. Despite the use of the term "full" mesh, IBGP connections do not need to exist between every pair of routers in the AS. Only routers that have information to communicate need an IBGP connection to every other router in the AS. As the border routers discover all external paths they are the ones that need to have full EBGP connectivity. The arrows in FIG. 17 represent the IBGP connections. The direction of the arrows represents the direction of information flow. Note that information is exchanged in both directions on the connection between the two border routers.

Figure 19:
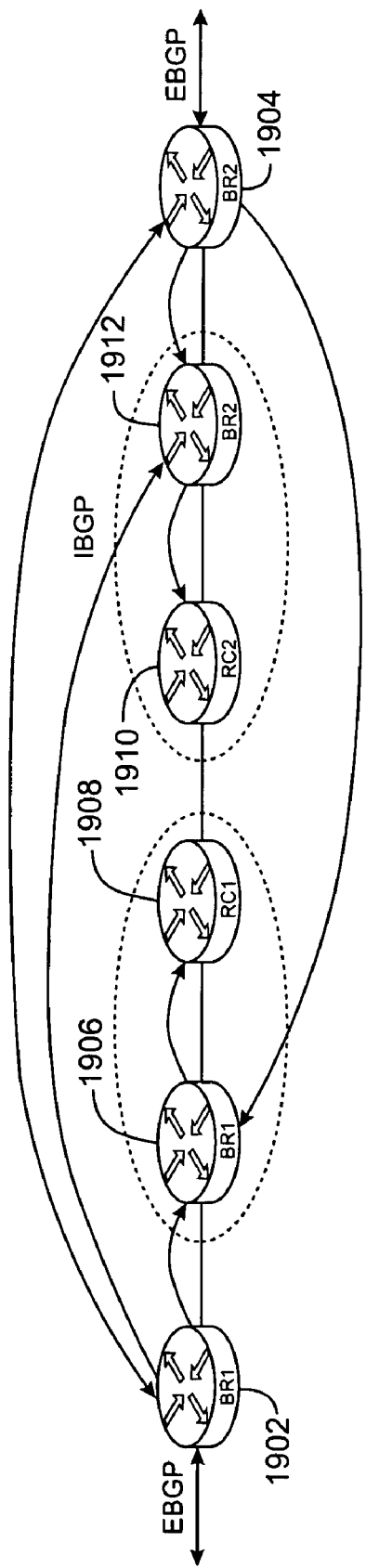
FIG. 19 depicts information propagation employing IBGP route reflection.

FIG. 19 shows the same network topology, albeit using route reflectors. There are two border routers 1902 and 1904. Of the interior routers, routers 1906 and 1908 are route reflectors while routers 1910 and 1912 are route reflector clients. Each route reflector needs to be connected to all the border routers. In this deployment the reflector clients receive routing information through a single reflector each and have only one IBGP connection.

Figure 20:
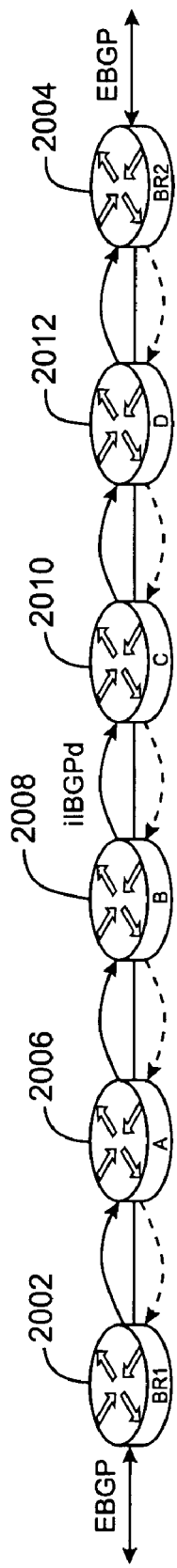
FIG. 20 depicts information propagation employing iBGPd according to one embodiment of the present invention.

FIG. 20 shows the same network topology using iBGPd according to one embodiment of the present invention. There are two border routers 2002 and 2004 and four interior routers 2006, 2008, 2010, and 2012. All internal routers participate in both sessions and propagate session data downstream to the next hop. The border routers also participate in each other's session.

Now consider how information consistency throughout the AS is affected by each solution. Using the IBGP "full" mesh, as soon as a border router discovers through EBGP and digests a new winning path, it propagates it in parallel to other AS routers. Despite the parallel propagation, variable delays exist until the communicated path makes it to the forwarding tables of the individual internal routers. The delay can vary for a number of reasons:

The order in which the BGP component on the border router attempts to write to the TCP connection for each IBGP session introduces a delay between the times different internal routers receive new information.

The congestion control state of each TCP connection at the border router can introduce additional delay to the transmission of the information.

The BGP component in a receiving router can take a variable amount of time to digest the new information and select it is a path that should be used.

More time can pass until the new selected path makes it from the BGP component through the RIB to the FIB of each router.

As a result, when a router in the middle of the router chain finishes the process and installs the new forwarding information in its FIB, there is no guarantee that that the routers between it and the border router originating the information are ready to forward. The same applies to the border router at the opposite end of the network that may propagate the new path externally before forwarding through the AS is established.

The problem of inconsistency in the sequence of information discovery throughout the network is made worse with route reflectors. When using reflectors an additional delay is introduced before route reflector clients discover new routing information. The delay is caused by the time it takes for the route reflector itself to receive, digest and propagate the information. Compared to AS routers with direct IBGP connections to the border router that has the new path, reflector clients experience further delay in updating their own forwarding information.

The use of iBGPd provides significant improvements. With iBGPd there is a predetermined order of information propagation. Routing data propagates outwards from the border router along the reverse path that routed IP packets will follow. When a router in the AS receives new routing information about a destination, it can be certain that all routers on the IGP forwarding path between itself and the exit border router have also received the new information. Although variable delays in installing path information in local FIBs may remain, stability is greatly improved.

Because iBGPd enforces regularity in the order information propagates through the AS, it becomes possible to reason about how forwarding is affected while the network is discovering a new path or while a path is being withdrawn. This will be illustrated with reference to FIGS. 21-24. As an example, a simple network of five routers in a row is used with two border routers 2102 and 2104 at each end and three internal routers between them 2106, 2108, and 2110. The scenarios that will be discussed refer to routing to a single destination prefix. Two paths will be available to route to the destination. Path A is available through border router 2102 and path B through border router 2104.

Figure 21:
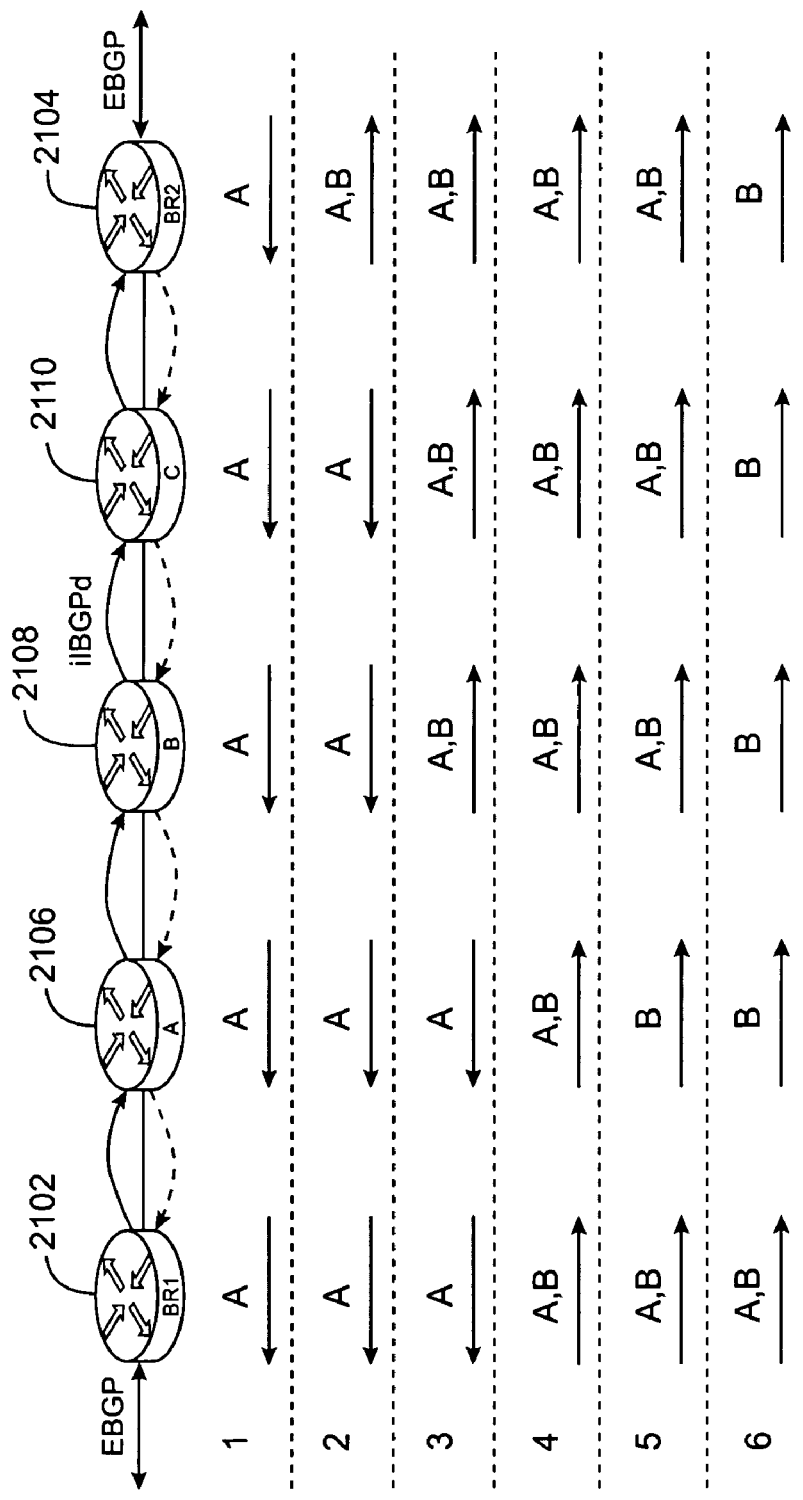
FIG. 21 depicts switching between paths employing iBGPd according to one embodiment of the present invention.

The first example describes how the network that has settled on path A through border router 2102 switches to the new path B that is discovered through border router 2104. The stage that the network goes through in evolving its routing state during the switchover are shown in FIG. 21.

Each numbered row represents a stage in time. Only stages of interest are shown and many intermediate stages are omitted. For each stage, the available paths and the direction of IP forwarding at each router are shown. The description of each stage is as follows:

1. Border router 2102 has propagated path A through its iBGPd session. The path information has made it to all the routers in the network and they are all forwarding data for the destination towards border router 2102 (indicated by the arrows pointing left).

2. Border router 2104 discovers path B through its EBGP connection. Path B is better than path A hence it wins the bestpath selection and border router 2104 starts forwarding towards the right.

3. Border router 2104 starts propagating information on path B through its IBGPD session. At this stage, path B has been propagated over two hops. Both routers 2108 and 2110 that have received the path elect it as the winning path and start forwarding towards the right through border router 2104.

4. The new path makes it to all the routers in the network and they all forward through border router 2104. At this point border router 2102 realizes that its own path is no longer a winning path and that it should be withdrawn from internal circulation.

5. Border router 2102 starts distributing the withdrawal of path A through its iBGPd session. Note that border router 2102 still stores the path in the RIB-in of its EBGP connection.

6. The path withdrawal has made it through the network.

Clearly withdrawing a path that is no longer in use (stages 5 and 6) is optional as routing functions correctly anyway (from step 4 onwards). The advantage of withdrawing the path is that internal routers no longer need to store it (although to support RMRT functions they should store enough information to remember that it has been withdrawn). Note that removal of a losing path is also the default mode of operation of IBGP. In iBGPd, the decision of withdrawing a losing path from internal circulation affects routing behavior when later the winning path goes away.

At every stage of the iBGPd new route advertisement process described above no microloops were formed. Routing was always in a consistent state and every router continuously had the ability to reach the destination.

The second example starts with both paths available in the network (where the previous example left off). The winning path is still path B and the external peer of border router 2104 will now withdraw it. The option of whether border router 2102 had previously withdrawn the losing path A from internal circulation has an impact in this example. We describe the scenarios for both options starting with the one where path A was withdrawn.

Figure 22:
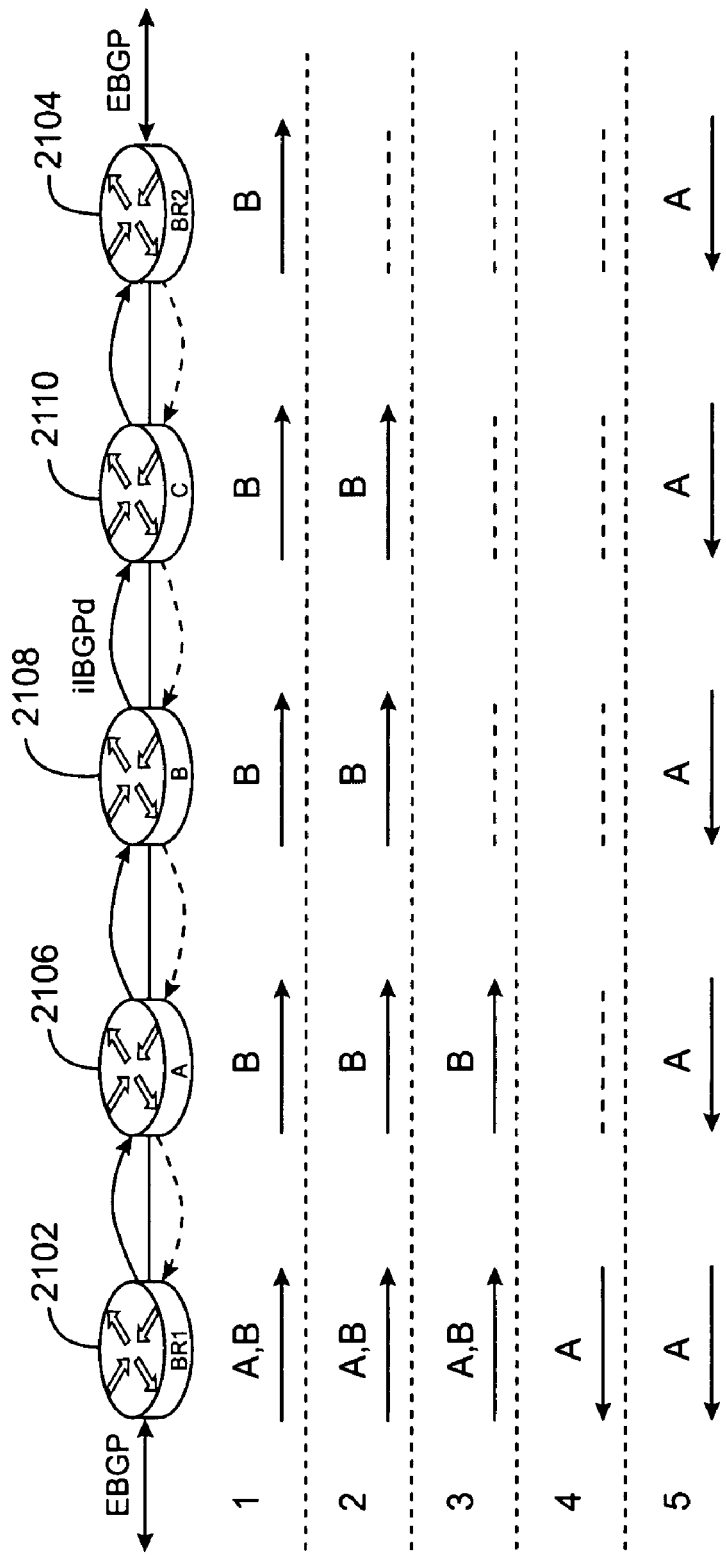
FIG. 22 depicts withholding of a losing path and withdrawal of a winning path employing iBGPd according to one embodiment of the present invention.

FIG. 22 shows the stages that the network goes through when border router 2102 is already withholding path A from internal distribution and border router 2104 discovers that path B is being withdrawn:

1. In the initial stage all routers are using path B. Border router 2102 also has path A stored in its EBGP RIB-in but it is not being used for forwarding as it loses in the bestpath selection.

2. Border router 2104 is told through its EBGP connection that B is no longer a valid path. As there is no alternative available it stops forwarding data targeted at the destination.

3. Border router 2104 advertises the withdrawal of path B in its iBGPd session and more routers along the path stop forwarding.

4. The withdrawal of path B has propagated all the way to border router 2102. Now path A wins the bestpath selection and border router 2102 starts using it.

5. Border router 2102 propagates path A through its iBGPd session and all routers start forwarding again towards the left.

The above scenario has the advantage that no micro-loops were formed during the withdrawal of path B and the re-advertisement of path A. The drawback is that forwarding was disrupted until both the withdrawal and the re-advertisement were complete.

Figure 23:
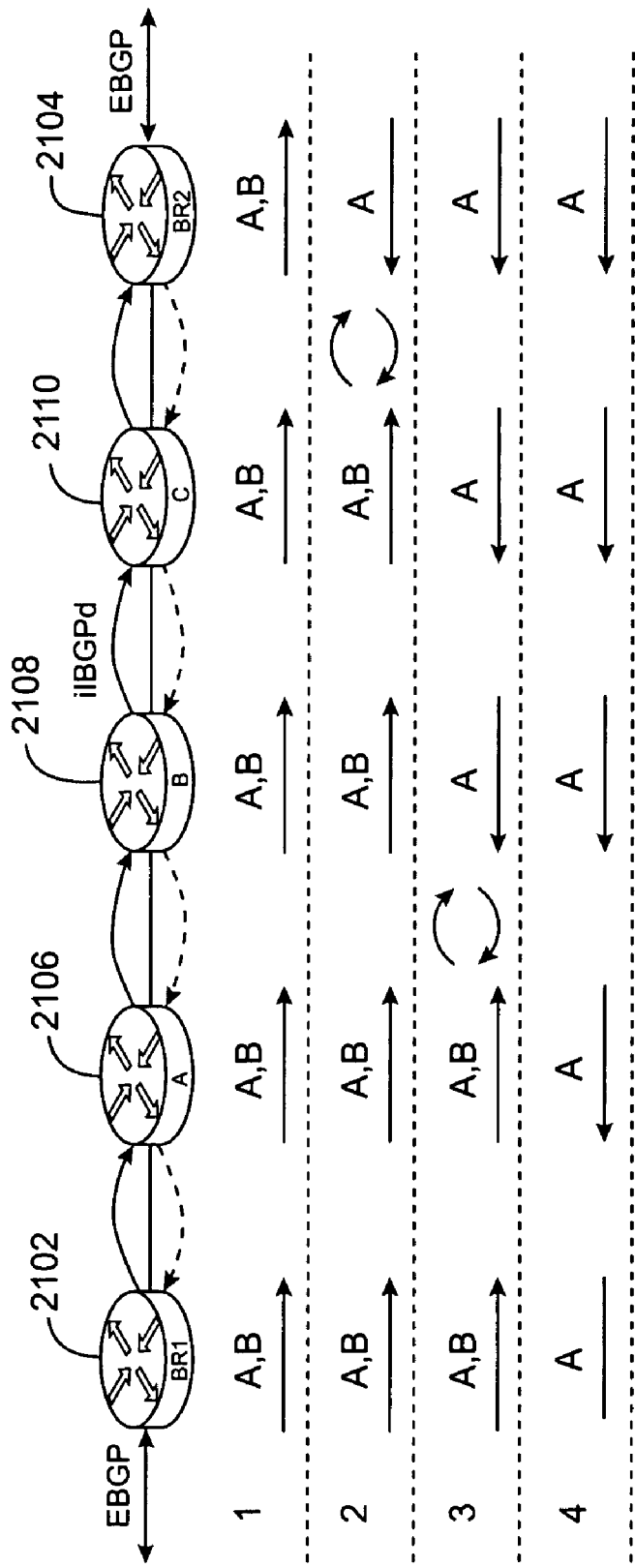
FIG. 23 depicts advertisement of a losing path and withdrawal of a winning path employing iBGPd according to one embodiment of the present invention.

The alternative state of affairs where border router 2102 never withdrew the losing path through its iBGPd connection is described with reference to FIG. 23.

1. In the initial stage both paths are available to all five routers. However, only path B is being used as path A loses the bestpath selection.

2. Border router 2104 is told through its EBGP connection that B is no longer a valid path. Border router 2104 immediately starts using path A and forwards towards the left creating a micro-loop (as the internal router to its left is still forwarding towards the right).

3. Border router 2104 advertises the withdrawal of path B in its iBGPd session. Routers that have been updated start using path A. The location of the microloop moves backwards towards border router 2102 as the withdrawal information propagates.

4. All routers have been updated on the withdrawal of path B and are using path A to forward.

The advantage of this scenario is that as soon the withdrawal information of path B made it across the network, forwarding was restored. Border router 2102 did not need to re-advertise path A as it was never withdrawn. The drawback is that during the withdrawal micro-loops formed on every internal hop.

Another example explores the capability of iBGPd to use load-sharing between multiple paths of equal cost. The network topology remains the same as for earlier sections but this time the paths A and B through border router 2102 and border router 2104 respectively are equally good. When the border routers evaluate the two paths to select a winning path, the comparison depends on IGP distance and each border router picks its own path. Therefore, each border router keeps advertising its own external path through its iBGPd session and both paths are available on all internal routers. What happens if an external peer withdraws one of the two paths in this situation will be described with reference to FIG. 24.

Figure 24:
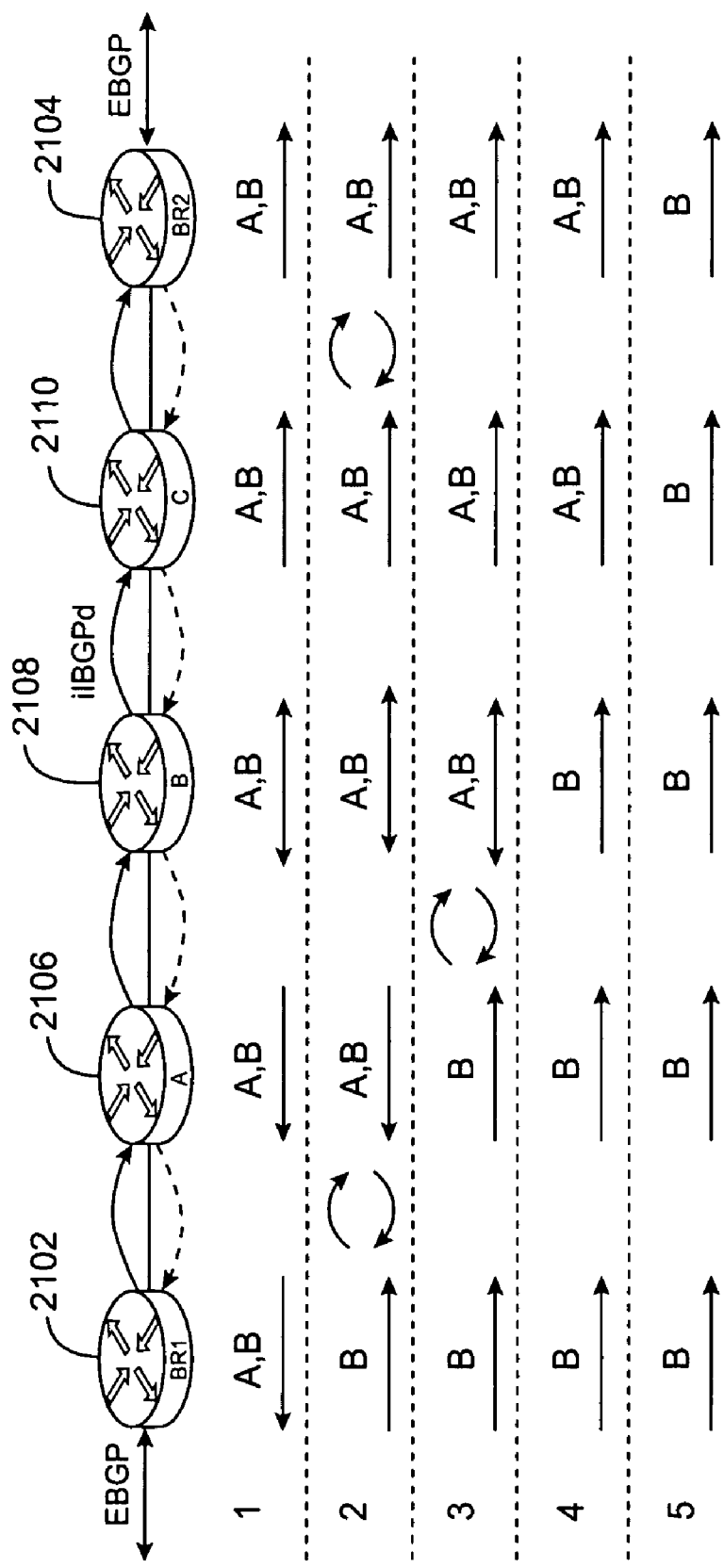
FIG. 24 depicts multipath loadsharing employing iBGPd according to one embodiment of the present invention.

FIG. 24 shows the stages of evolution of routing state:

1. In the initial stage all routers have both paths. Each router is forwarding to the closest exit. The exception is the middle router that is equidistant from both border routers. It therefore uses both paths and load-shares between them.
2. The EBGP peer of border router 2102 informs it that path A has been withdrawn. Border router 2102 starts using path B and forwards towards the right. A micro-loop forms.
3. Border router 2102 advertises the withdrawal of path A in its iBGPd session. Routers further down the path start using path B and the micro-loop moves forward.
4. As soon as the middle router receives the withdrawal information it also starts using only path B for forwarding. At this point the micro-loop is eliminated. The remaining routers that have not yet heard about the withdrawal of A were only using path B in the first place, as border router 2104 is closer to them.
5. The withdrawal propagates to all routers and they all use path B to forward.

IBGPD Synchronization

IBGPd supports and makes use of the synchronization process provided by RMRT as described above. IBGPd provides all ADUs in its database to the RMRT application upon request. Through the up-calls described above, iBGPD walks through the database, sending RMRT ADUs as it goes along. RMRT sends the ADUs to the downstream neighbor that has requested synchronization. Older ADUs will likely not have sequence numbers since they have been disassociated. IBGPd supports parallel walk operations through the same database because multiple downstream nodes may request synchronization simultaneously. The RIB data structure described with reference to FIG. 18 facilitates servicing synchronization requests. Also, because ADUs having superceded prefix state are deleted, iBGPd does not typically provide a rewind up-call to RMRT. Therefore, RMRT will normally buffer all unacknowledged data in a synchronization process for an iBGPd client.

A special restriction on the ADU purging mechanism described above should be enforced during a synchronization session. At the synchronization parent, no ADUs should be purged with sequence numbers later than the sequence number that was current at the start of synchronization unless they have already been communicated in the synchronization session. This is not a very detrimental restriction. The rule does not prevent ADUs that were generated after the start of synchronization from being replaced by later ADUs containing updated state about the same prefix. Hence, it does not modify the default iBGPd behavior apart from introducing a temporary limit on the withdrawal ADU purging process.

IBGPD VPN Support

Figure 25:
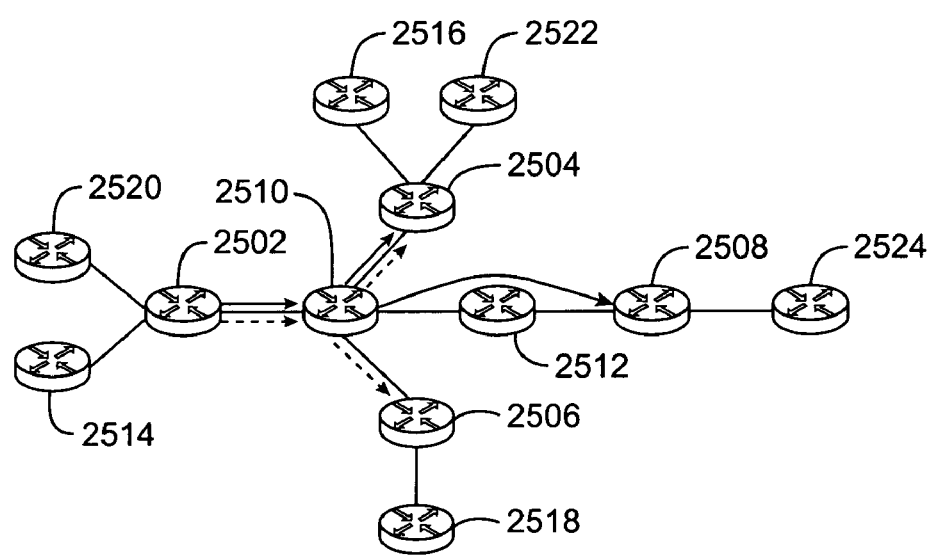
FIG. 25 depicts iBGPd operation on a VPN backbone according to one embodiment of the present invention.

IBGPd may also be used to provide support for BGP VPNs (virtual private networks) as known in the art. Multiple VPNs may be operated across a single provider network. FIG. 25 depicts a simple VPN scenario to which iBGPd may be applied according to one embodiment of the present invention. A simplified provider network includes four "provider edge" routers 2502, 2504, 2506, and 2508 at the network periphery and two provider routers 2510 and 2512 within the network core. A first "red" virtual private network interconnects three customer edge routers 2514, 2516, and 2518. A second "green" virtual private network interconnects three customer edge routers 2520, 2522, and 2524.

A complete description of VPN operation is beyond the scope of the present discussion and unnecessary to understanding of the present invention. Those of skill in the VPN art recognize that an important aspect of VPN operation is the constrained distribution of BGP routing information. A router that is transmitting VPN paths via BGP uses an attribute to specify the BGP listeners that will record the path and which VPN forwarding table(s) within the receiving routers will be updated. In some cases this attribute consists of one or more "Route Targets." In simple cases, the attribute includes a "Route Distinguisher," which has been chosen to signify a particular client VPN.

Embodiments of the present invention exploit iBGPd to distribute VPN routing information within an AS. A particular iBGPD session can be mapped to, e.g., one or more Route Targets, a particular Route Distinguisher, or any other identifier used to specify which routers are to use the paths distributed via the session. The provider routers, if they are in the path of information flow, are configured to operate as RMRT transit routers for all of the VPN sessions since they do not record VPN routing information. The provider edge routers in the information flow for a particular session operate as transit routers or RMRT receivers depending on whether they require knowledge of the VPN routes. The RMRT transit routers preferably cache ADUs only if they have more than one downstream receiver.

Consider again the example in FIG. 25. The green and red VPNs have associated Route Targets and there are two iBGPd sessions that are originated by provider edge router 2502, one for each Route Target. The arrows represent the sessions with a solid line representing the green network's session and a dotted line representing the red network's session.

The red customer edge routers 2514, 2516, and 2518 receive the red iBGPd session originated by provider edge router 2502. Customer edge routers 2516 and 2518 join the session through provider router 2510 which becomes an RMRT transit router for the red session. Although provider router 2510 participates in the forwarding function of the session, it does not keep a copy of the session data and only stores a minimal number of ADUs in its RMRT cache. The stored ADUs are used to provide retransmissions to provider edge routers 2504 and 2506.

The green iBGPd session originated by provider edge router 2502 is joined by provider edge routers 2504 and 2508. Provider edge router 2504 joins through provider router 2510 and provider edge router 2508 joins through provider routers 2512 and 2510. The difference in the propagation of the green session from provider edge router 2502 is in the way data is received by provider edge router 2508. As provider router 2512 only has a single downstream receiver for the session, it realizes that there is no value in its participation as a cache and it arranges for data to be tunneled from provider router 2510 to provider edge router 2508.

In an alternative scenario, provider edge router 2502 uses a single iBPGd session to distribute the paths for both VPNs. The paths are tagged so that the iBGPd session receivers know which VPN forwarding table to assign each path to.

There is thus only one session distribution tree to support both VPNs. However, provider edge routers 2506 and 2508 will receive and filter out paths for the VPN that they are not supporting.

Network Device Details

Linecards 1102 include network interfaces for coupling to physical media. Forwarding intelligence may also be found within linecards 1102. Only two linecards 1102 are depicted although it will be understood that there may actually be a very large number of linecards in the same network device 1100. Linecards 1102 are interconnected by a high-speed backplane 1104 for transferring of packets. A routing processor 1106 is responsible for control plane functionality. Routing processor 1106 has a relatively low-speed connection to high-speed backplane 1104.

Figure 11A:
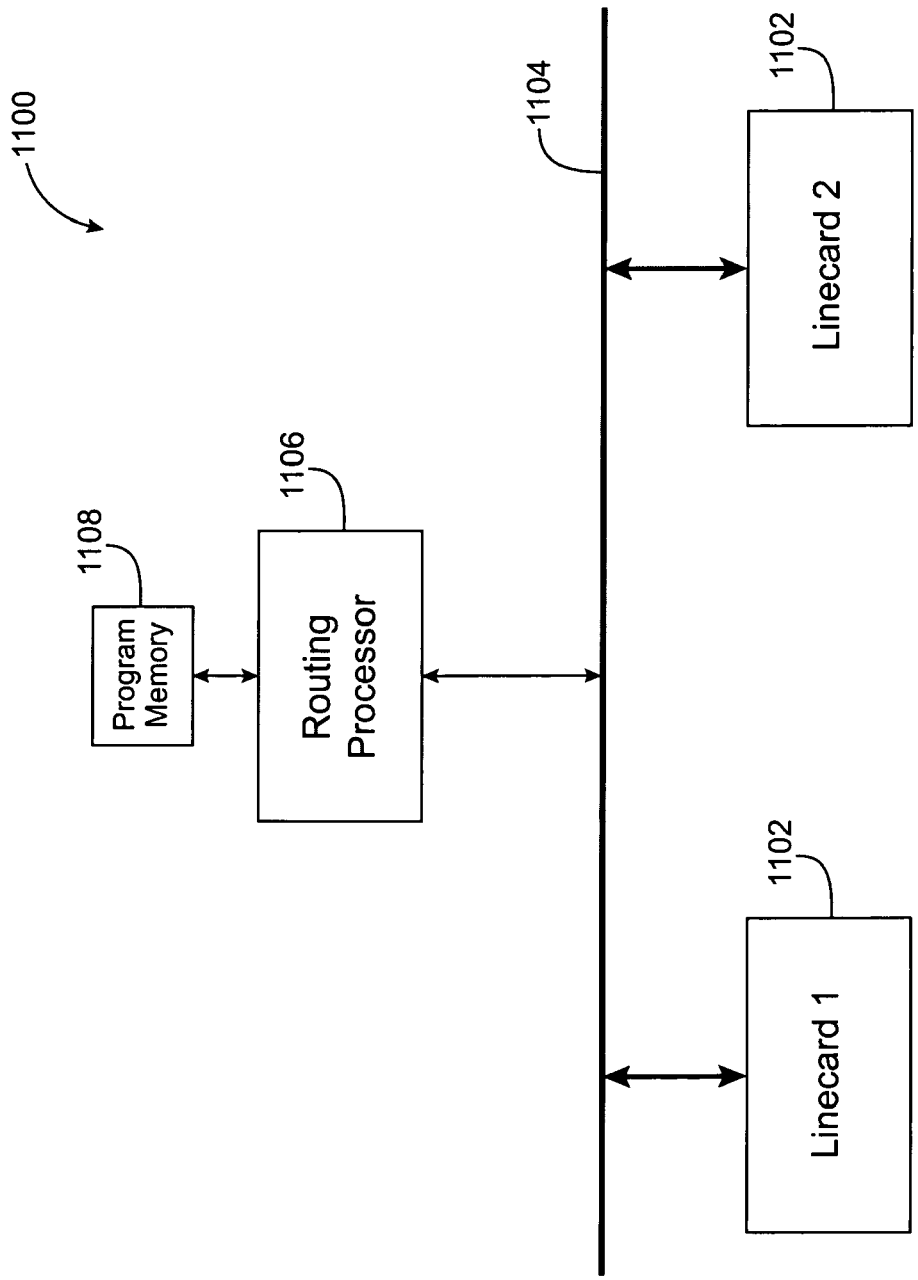
FIG. 11A depicts a network device according to one embodiment of the present invention.
Figure 11B:
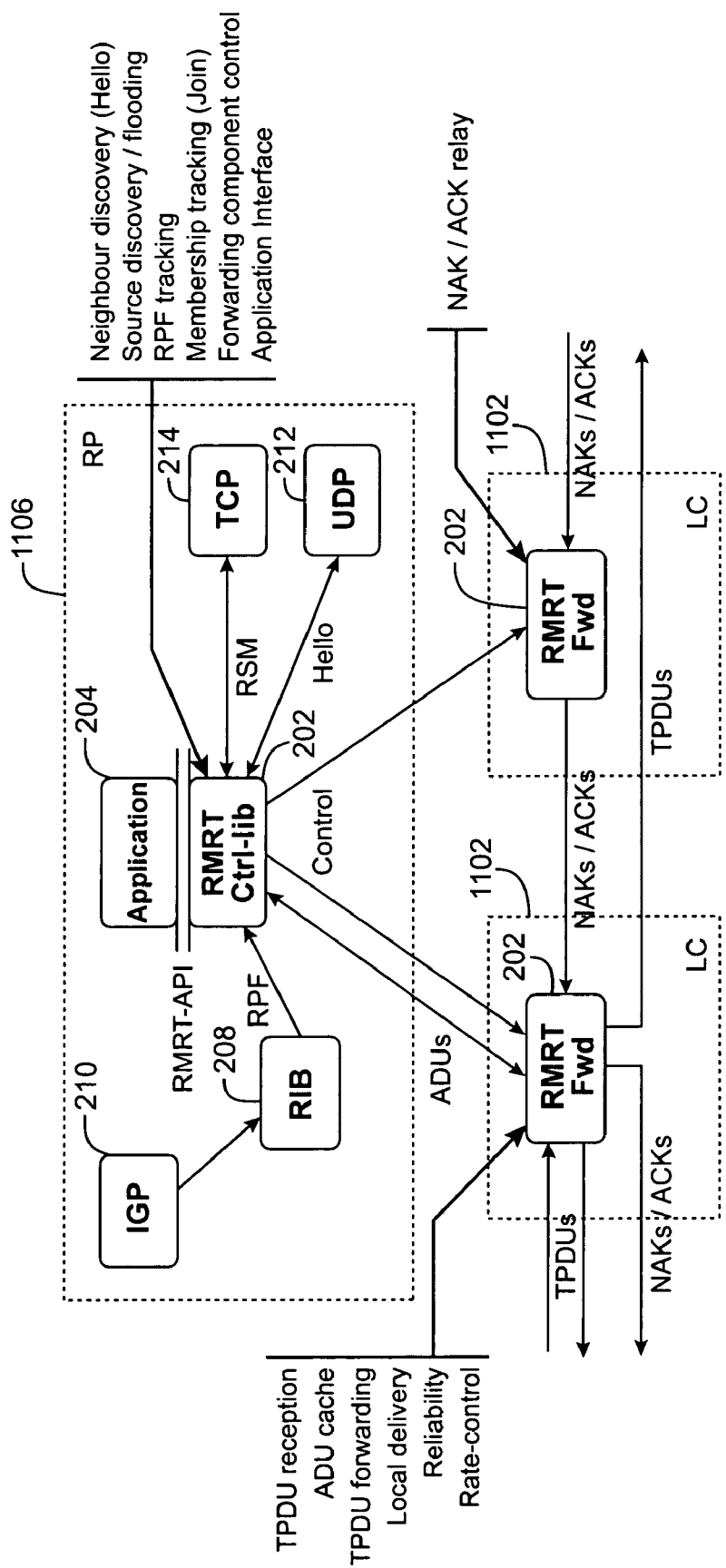
FIG. 11B depicts how functionality of the present invention may be divided between a routing processor and linecards.

Functionality of embodiments of the present invention may be divided between routing processor 1106 and linecards 1102 as shown in FIG. 11B. Generally speaking, in FIG. 11B the control components and the application (iBGPd) are implemented by routing processor 106 while caching and forwarding of ADUs are handled by linecards 1102 along with the acknowledgement mechanism. For example, routing processor 1106 may implement RPF neighbor tracking component 302, membership tracking component 304, the interface to application 204, and control of TPDU forwarding. Routing processor 1106 also implements the synchronization processes described above.

TPDU reception component 306, ADU cache 310, and TPDU propagation component 308 may be implemented on each of linecards 1102. The linecards 1102 are also responsible for retransmission. Each RMRT session is hosted on the linecard that serves as the interface to the upstream directly-connected neighbor. This linecard maintains the ADU cache 310 for the RMRT session. TPDUs to be propagated downstream are transferred to the linecards directly connected to the subscribing downstream neighbors. Similarly, positive and negative acknowledgements are received at the downstream-facing linecards and transferred to the linecard hosting the RMRT session to be either handled there or relayed to the upstream neighbor as appropriate. RMRT can thus be implemented within the context of a distributed forwarding architecture where packets are generally not handled directly by the routing processor but rather kept on the linecards for processing.

A portion of the functionality of routing processor 1106 may be implemented by software including instructions stored in a program memory 1108. Program memory 1108 is but one example of a computer-readable storage medium that can store software used when implementing embodiments of the present invention. Other examples include, e.g., hard drives, CD-ROMs, DVD-ROMs, flash memories, etc. Linecards 1102 may include their own processor functionality which may similarly be implemented in software.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. A method for distributing routing information within an autonomous system from a border router of said autonomous system, said method comprising:

establishing a multi-party transport protocol session wherein said border router is a session source in communication with multiple receivers in said same multi-party transport protocol session, wherein the multiple receivers are nodes of said autonomous system;

receiving a join message from a directly-connected node, the join message comprising a request to participate in said established multi-party transport protocol session;

receiving external border gateway protocol (EBGP) routing information from nodes outside said autonomous system;

processing said external border gateway protocol (EBGP) routing information to develop internal border gateway protocol (IBGP) routing information; and distributing said internal border gateway protocol (IBGP) routing information as a part of said multi-party transport protocol session via a distribution tree comprising said receivers in said multi-party transport protocol session.

2. The method of claim 1 wherein distributing comprises:

encapsulating said internal border gateway protocol (IBGP) routing information within transport protocol data units; and sending said internal border gateway protocol (IBGP) routing information to directly-connected ones of said receivers.

3. The method of claim 1 further comprising identifying in the autonomous system one or more neighboring nodes by identifying a path toward said session source based on unicast routing protocol information to form a distribution tree for internal border gateway protocol (IBGP) routing information from the session source.

4. The method of claim 1 wherein said routing information comprises virtual private network (VPN) routing information.

5. A method of operating a router in an autonomous system, said method comprising:

identifying a next-hop router toward a source of a multi-party transport protocol session, said multi-party transport protocol session comprising multiple receivers in communication with said source in said same multi-party transport protocol session;

sending a join message to said next-hop router, said join message comprising a request to participate in said multi-party transport protocol session;

receiving border gateway protocol (BGP) information from said next-hop as a part of said multi-party transport protocol session; and updating a router information base (RIB) based on said received border gateway protocol (BGP) information.

6. The method of claim 5 further comprising:

receiving a request from a directly-connected node to participate in said multi-party transport protocol session; and propagating said border gateway protocol (BGP) information to said directly-connected node.

7. The method of claim 5 further comprising:

responding to a request for retransmission from a directly-connected node by retrieving said border gateway protocol (BGP) information from said router information base (RIB).

8. The method of claim 5 wherein updating said border gateway protocol information comprises:

storing said border gateway protocol (BGP) information in a linked list in order of generation by said source of a multi-party transport protocol session.

9. The method of claim 8 wherein elements of said linked list are stored in a tree structure shared among multiple said multi-party transport protocol sessions.

10. A non-transitory computer readable storage medium encoded with a computer program for distributing routing information within an autonomous system from a border router of said autonomous system, said computer program comprising:

code that establishes a multi-party transport protocol session wherein said border router is a session source in communication with multiple receivers in said same multi-party transport protocol session, wherein the multiple receivers are nodes of said autonomous system;

code that receives a join message from a directly-connected node, the join message comprising a request to participate in said established multi-party transport protocol session;

code that receives external border gateway protocol (EBGP) routing information from nodes outside said autonomous system;

code that processes said external border gateway protocol (EBGP) routing information to develop internal border gateway protocol (IBGP) routing information; and code that distributes said internal border gateway protocol (IBGP) routing information as a part of said multi-party transport protocol session via a distribution tree comprising said receivers in said multi-party transport protocol session.

11. The non-transitory computer readable storage medium of claim 10 wherein said code that distributes comprises:

code that encapsulates said internal border gateway protocol (IBGP) routing information within transport protocol data units; and code that sends said internal border gateway protocol (IBGP) routing information to directly-connected ones of said receivers.

12. The non-transitory computer readable storage medium of claim 10 wherein said distribution tree is formed by way of each of said receivers identifying a path toward said session source based on unicast routing protocol information.

13. The non-transitory computer readable storage medium of claim 10 wherein said routing information comprises virtual private network (VPN) routing information.

14. A non-transitory computer readable storage medium encoded with a computer program for operating a router in an autonomous system, said computer program comprising:

code that identifies a next-hop router toward a source of a multi-party transport protocol session, said multi-party transport protocol session comprising multiple receivers in communication with said source in said same multi-party transport protocol session;

code that sends a join message to said next-hop router, said join message comprising a request to participate in said multi-party transport protocol session;

code that receives border gateway protocol (BGP) information from said next-hop as a part of said multi-party transport protocol session; and code that updates a router information base (RIB) based on said received border gateway protocol (BGP) information.

15. The non-transitory computer readable storage medium of claim 14 further comprising:

code that receives a request from a directly-connected node to participate in said multi-party transport protocol session; and code that propagates said border gateway protocol (BGP) information to a directly-connected node.

16. The non-transitory computer readable storage medium of claim 15 further comprising:

code that responds to a request for retransmission from said directly-connected node by retrieving said border gateway protocol (BGP) information from said router information base (RIB).

17. The non-transitory computer readable storage medium of claim 14 wherein said code that updates said border gateway protocol (BGP) information comprises:

code that stores said border gateway protocol (BGP) information in a linked list in order of generation by said session source.

18. The non-transitory computer readable storage medium of claim 17 wherein elements of said linked list are stored in a tree structure shared among multiple multi-party transport protocol sessions.

19. Apparatus for distributing routing information within an autonomous system from a border router of said autonomous system, said apparatus comprising:

means for establishing a multi-party transport protocol session wherein said border router is a session source in communication with multiple receivers in said same multi-party transport protocol session that are nodes of said autonomous system;

means for receiving a join message from a directly-connected node, the join message comprising a request to participate in said established multi-party transport protocol session;

means for receiving external border gateway protocol (EBGP) routing information from nodes outside said autonomous system;

means for processing said external border gateway protocol (EBGP) routing information to develop internal border gateway protocol (IBGP) routing information; and means for distributing said internal border gateway protocol (IBGP) routing information as a part of said multi-party transport protocol session via a distribution tree comprising said receivers in said multi-party transport protocol session.

20. Apparatus for operating a router in an autonomous system, said apparatus comprising:

means for identifying a next-hop router toward a source of a multi-party transport protocol session, said multi-party transport protocol session comprising multiple receivers in communication with said source in said same multi-party transport protocol session;

means for sending a join message to said next-hop router to participate in said multi-party transport protocol session;

means for receiving border gateway protocol (BGP) information from said next-hop as a part of said multi-party transport protocol session; and means for updating a router information base (RIB) based on said received border gateway protocol (BGP) information.

21. Apparatus for distributing routing information within an autonomous system from a border router of said autonomous system, said apparatus comprising:

a processor that executes instructions; and a memory device having said instructions stored thereon, said instructions comprising:

code that establishes a multi-party transport protocol session wherein said border router is a session source in communication with multiple receivers in said same multi-party transport protocol session, wherein the multiple receivers are nodes of said autonomous system;

code that receives a join message from a directly-connected node, the join message comprising a request to participate in said established multi-party transport protocol session;

code that receives external border gateway protocol (EBGP) routing information from nodes outside said autonomous system;

code that processes said external border gateway protocol (EBGP) routing information to develop internal border gateway protocol (IBGP) routing information; and code that distributes said internal border gateway protocol (IBGP) routing information as a part of said multi-party transport protocol session via a distribution tree comprising said receivers in said multi-party transport protocol session.

22. Apparatus for operating a router in an autonomous system, said apparatus comprising:

a processor that executes instructions; and a memory device having said instructions stored thereon, said instructions comprising:

code that identifies a next-hop router toward a source of a multi-party transport protocol session, said multi-party transport protocol session comprising multiple receivers in communication with said source in said same multi-party transport protocol session;

code that sends a join message to said next-hop router, said join message comprising a request to participate in said multi-party transport protocol session;

code that receives border gateway protocol (BGP) information from said next-hop as a part of said multi-party transport protocol session; and code that updates a router information base (RIB) based on said received border gateway protocol (BGP) information.

23. The method of claim 2 wherein said transport data units are transmitted utilizing an unreliable datagram protocol.

24. The method of claim 1 further comprising generating a session announcement message including a session description and an identifier of the selected node as a source of a transport layer session for distributing database updates.

25. The method of claim 1 further comprising receiving at a node in the autonomous system a join message from a directly-connected receiver seeking to join said multi-party transport protocol session.

* * * * *